US012764813B2

(12) United States Patent
Li et al.

(10) Patent No.: US 12,764,813 B2
(45) Date of Patent: Oct. 13, 2026

(54) STR CAPABILITY INDICATION METHOD AND RELATED APPARATUS

(71) Applicant: HUAWEI TECHNOLOGIES CO., LTD., Shenzhen (CN)

(72) Inventors: Yunbo Li, Shenzhen (CN); Yuchen Guo, Shenzhen (CN); Yifan Zhou, Shenzhen (CN); Guogang Huang, Shenzhen (CN); Yiqing Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 784 days.

(21) Appl. No.: 18/077,793

(22) Filed: Dec. 8, 2022

(65) Prior Publication Data

US 2023/0103325 A1 Apr. 6, 2023

Related U.S. Application Data

(63) Continuation of application No. PCT/CN2021/100633, filed on Jun. 17, 2021.

(30) Foreign Application Priority Data

Jun. 17, 2020 (CN) ......................... 202010556092.7

(51) Int. Cl.
*H04W 76/15* (2018.01)
*H04W 24/08* (2009.01)

(52) U.S. Cl.
CPC ........... *H04W 76/15* (2018.02); *H04W 24/08* (2013.01)

(58) Field of Classification Search
CPC ..... H04W 76/15; H04W 24/08; H04W 24/02; H04W 84/12; H04W 8/24;
(Continued)

(56) References Cited

U.S. PATENT DOCUMENTS 9,712,233 B1 7/2017 Deng et al.
9,838,193 B2 12/2017 Kazmi et al.
(Continued)

FOREIGN PATENT DOCUMENTS

CN 103765937 A 4/2014
CN 106464345 A 2/2017
(Continued)

OTHER PUBLICATIONS

The Art of Computer Programming , Fascicle 1, 2009, by Donald E. Knuth, Stanford University Press (Year: 2009).*
(Continued)

*Primary Examiner* — Charles C Jiang
*Assistant Examiner* — Margaret Marie Anderson

(57) ABSTRACT

In a method for indicate simultaneous transmit and receive (STR) capability in a Wi-Fi system, a first multi-link device (MLD) generates and sends STR capability information that indicates interference parameter information between a first link using a first bandwidth and a second link using a second bandwidth. A second device receives the STR capability information and obtains an interference parameter threshold. The second device then determines, based on the interference parameter threshold and the interference parameter information, whether the first MLD supports an STR operation on the first link and the second link.

18 Claims, 17 Drawing Sheets

(58) Field of Classification Search
CPC ............. H04W 28/0875; H04W 76/10; H04W 28/0236; H04W 28/06; H04W 28/18
See application file for complete search history.

(56) References Cited

U.S. PATENT DOCUMENTS

| | | | | |
|---|---|---|---|---|
| 10,153,889 | B2 | 12/2018 | Cheng et al. | |
| 10,257,715 | B2 | 4/2019 | Egner et al. | |
| 2011/0222408 | A1 | 9/2011 | Kasslin et al. | |
| 2018/0206284 | A1 | 7/2018 | Zhou et al. | |
| 2019/0082373 | A1 | 3/2019 | Patil et al. | |
| 2020/0053773 | A1 | 2/2020 | Seok et al. | |
| 2023/0083503 | A1 * | 3/2023 | Han .................. | H04W 74/0816 370/328 |

FOREIGN PATENT DOCUMENTS

| | | | |
|---|---|---|---|
| CN | 108230428 | A | 6/2018 |
| KR | 20190021407 | A | 3/2019 |
| WO | 2014046761 | A1 | 3/2014 |
| WO | 2019105393 | A1 | 6/2019 |
| WO | 2020085997 | A1 | 4/2020 |

OTHER PUBLICATIONS

Yifan Zhou (Huawei):"Simultaneous Tx/Rx Capabilityindication for multi-link operation", IEEE Draft; 11-19-1550-01-00 B E-S I M U Ltan Eous-Tx-Rx-Capability-Indication-for-Multi-Link-Operation, IEEE-SA Mentor, Piscataway, NJ USA, vol. 802.11 EHT; 802.11 be, No. 1 Nov. 26, 2019 (Nov. 26, 2019), pp. 1-10, XP068164907.

IEEE 802.11-20/0527r0, Yongho Seok et al, Multi-link Constraint Signaling, Apr. 2020, 11 pages.

IEEE 802.11-20/0809r0, Pooya Monajemi et al, STR Capability Report, May 2020, 12 pages.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

Adnan Aijaz et al., "Simultaneous Transmit and Receive Operation in Next Generation IEEE 802.11 WLANs: A MAC Protocol Design Approach", Dec. 2017,total:8pages.

Rojan Chitrakar et al:"Multi-link transmission", Jul. 2019, IEEE 802.11-19/1128r0, total 8 pages.

Zhou Yifan et al, IEEE 802.11-19/1550r1, Simultaneous Tx/Rx Capability indication for multi-link operation, Sep. 2019, total 11 pages.

* cited by examiner

STR CAPABILITY INDICATION METHOD AND RELATED APPARATUS

CROSS-REFERENCE TO RELATED APPLICATIONS

This application is a continuation of International Application PCT/CN2021/100633, filed on Jun. 17, 2021, which claims priority to Chinese Patent Application No. 202010556092.7, filed on Jun. 17, 2020. The disclosure of the aforementioned applications are hereby incorporated by reference in their entirety.

TECHNICAL FIELD

This application relates to the field of wireless communication technologies, and in particular, to an STR capability indication method and a related apparatus.

BACKGROUND

A continuous technical goal of development and evolution of a wireless local area network (WLAN) or a cellular network is to continuously improve throughput. WLAN system protocols are mainly discussed in the Institute of Electrical and Electronics Engineers (IEEE) standard group. In the standard such as IEEE 802.11a/b/g/n/ac/ax, data throughput is continuously improved. The next-generation Wi-Fi standard, IEEE 802.11be, is referred to as extremely high throughput (EHT) or Wi-Fi 7, and its most important technical goal is to significantly improve peak throughput.

In IEEE 802.11be, the peak throughput is improved by using a multi-link (ML) technology, to achieve the technical goal of extremely high throughput. The core idea of the multi-link technology is that a WLAN device that supports the next-generation standard IEEE 802.11 has a multi-band transmit and receive capability, so that a larger bandwidth is used for data transmission, thereby significantly improving the throughput. The multiple bands employed include, but is not limited to, a 2.4 GHz Wi-Fi frequency band, a 5 GHz Wi-Fi frequency band, and a 6 GHz Wi-Fi frequency band. A frequency band in which the WLAN device performs access and transmission may be referred to as one link, and a plurality of frequency bands in which the WLAN device performs access and transmission may be referred to as multi-links. A next-generation IEEE 802.11 standard station device that simultaneously supports a plurality of links is referred to as a multi-link device (MLD). The multi-link device may perform concurrent communications on a plurality of links, so that a transmission rate is greatly improved.

However, when frequency spacings between a plurality of frequency bands supported by the multi-link device are close, transmission of a signal in one frequency band affects reception of a signal in another frequency band. For this reason, the multi-link device cannot perform transmit and receive operations in the plurality of frequency bands independently. In other words, the multi-link device does not support a simultaneous transmit and receive (STR) operation, as sending a signal in one frequency band by a non-simultaneous transmit and receive (non-STR) multi-link device interferes with receiving a signal in another frequency band by the non-STR multi-link device. As a result, data packets to be received cannot be correctly demodulated in the another frequency band. FIG. 1 is a schematic diagram of mutual interference in a non-STR multi-link device in a plurality of frequency bands. As shown in FIG. 1, a non-STR multi-link device sends block acknowledgement BA 1 after receiving physical layer protocol data unit PPDU 1 on link 1, and sends BA 2 after receiving PPDU 2 on link 2. When BA 2 overlaps PPDU 1 in time, energy leaked during transmission of BA 2 on link 2 to link 1 will block reception of PPDU 1 on link 1. In this case, PPDUs on the two links need to be aligned to avoid mutual interference between the two links. The two links may also be referred to as a link pair. Therefore, in a wireless communication process, it is necessary to know whether both communication parties support STR. Therefore, how to indicate an STR capability of a multi-link device on a link pair to adapt to subsequent data communication becomes a problem to be resolved urgently.

SUMMARY

Embodiments of this application provide an STR capability indication method and a related apparatus, to indicate whether a multi-link device supports a simultaneous transmit and receive operation on one link pair (that is, two links), thereby laying a communication foundation for subsequent data communication.

The following describes this application from different aspects. It should be understood that mutual reference may be made to the following implementations and beneficial effects of the different aspects.

According to a first aspect, an embodiment of this application provides an STR capability indication method performed by a first multi-link device. The STR capability indication method includes: The first multi-link device generates and sends STR capability information, where the STR capability information indicates interference parameter information between a first link using a first bandwidth and a second link using a second bandwidth, and the interference parameter information is used to determine whether the first multi-link device supports a simultaneous transmit and receive operation on the first link and the second link. The simultaneous transmit and receive operation herein may mean transmission on one link concurrent with reception on another link.

In this solution, the STR capability information indicates interference parameter information in different bandwidth combinations, and whether the first multi-link device supports a simultaneous transmit and receive operation on two links may be determined based on the interference parameter information. That is, an STR capability on the two links is determined. In this way, when the multi-link device does not support the simultaneous transmit and receive operation, a simultaneous transmit and receive manner can be avoided, thereby laying a communication foundation for subsequent data communication.

According to a second aspect, an embodiment of this application provides an STR capability indication method performed by a second device. The STR capability indication method includes: The second device receives STR capability information from a first multi-link device; may obtain an interference parameter threshold; and determines, based on interference parameter information indicated by the STR capability information and the interference parameter threshold, whether the first multi-link device supports a simultaneous transmit and receive operation on a first link and a second link. The STR capability information indicates the interference parameter information between the first link using a first bandwidth and the second link using a second bandwidth.

Optionally, when an interference parameter included in the interference parameter information is less than the interference parameter threshold, the second device determines that the first multi-link device supports the simultaneous transmit and receive operation on the first link and the second link; when an interference parameter included in the interference parameter information is greater than or equal to the interference parameter threshold, the second device determines that the first multi-link device does not support the simultaneous transmit and receive operation on the first link and the second link.

According to a third aspect, an embodiment of this application provides a communication apparatus in a WLAN. The communication apparatus is a first multi-link device, and may be the first multi-link device, or a chip such as a Wi-Fi chip in the first multi-link device. The communication apparatus includes:

a processing unit, configured to generate STR capability information; and a transceiver unit, configured to send the STR capability information, where the STR capability information indicates interference parameter information between a first link using a first bandwidth and a second link using a second bandwidth, and the interference parameter information is used to determine whether the first multi-link device supports a simultaneous transmit and receive operation on the first link and the second link.

According to a fourth aspect, an embodiment of this application provides another communication apparatus in a WLAN. The communication apparatus is a second device, and may be the second device, or a chip such as a Wi-Fi chip in the second device. The communication apparatus includes:

a transceiver unit, configured to receive STR capability information from a first multi-link device, where the STR capability information indicates interference parameter information between a first link using a first bandwidth and a second link using a second bandwidth; and a processing unit, configured to: obtain an interference parameter threshold, and determine, based on the interference parameter information indicated by the STR capability information and the interference parameter threshold, whether the first multi-link device supports a simultaneous transmit and receive operation on the first link and the second link.

Optionally, when an interference parameter included in the interference parameter information is less than the interference parameter threshold, the processing unit is specifically configured to determine that the first multi-link device supports the simultaneous transmit and receive operation on the first link and the second link; or when an interference parameter included in the interference parameter information is greater than or equal to the interference parameter threshold, the processing unit is specifically configured to determine that the first multi-link device does not support the simultaneous transmit and receive operation on the first link and the second link.

In an implementation of any one of the foregoing aspects, the simultaneous transmit and receive operation may include a first operation and a second operation, the first operation may be that the first multi-link device transmits a first PPDU on the first link concurrently with receiving a second PPDU on the second link, and the second operation may be that the first multi-link device transmits the second PPDU on the second link concurrently with receiving the first PPDU on the first link.

Optionally, the interference parameter information may include two interference parameters, for example, a first interference parameter and a second interference parameter. The first interference parameter is an interference parameter of the first link to the second link when the first multi-link device performs the first operation. The second interference parameter is an interference parameter of the second link to the first link when the first multi-link device performs the second operation.

In this solution, when directions are differentiated, interference parameters in two directions (transmission on the first link concurrent with reception on the second link, and transmission on the second link concurrent with reception on the first link) are carried in the interference parameter information, and it can be determined whether the two links support a simultaneous transmit and receive operation in each direction. In a scenario in which link interference is asymmetric, more information can be obtained, and operations can be performed based on interference in different directions, making a communication mode more flexible.

In an implementation of any one of the foregoing aspects, the first bandwidth may be a bandwidth of the first PPDU, and the second bandwidth may be a bandwidth of the second PPDU. The bandwidth of the first PPDU and the bandwidth of the second PPDU are any one of the following: 20 MHz, 40 MHz, 80 MHz, 160 MHz, or 320 MHz. It may be understood that a bandwidth of a PPDU may be a bandwidth used when the current PPDU is sent.

In an implementation of any one of the foregoing aspects, the first bandwidth may be a maximum bandwidth supported by the first link, and the second bandwidth may be any one of 20 MHz, 40 MHz, 80 MHz, 160 MHz, or 320 MHz; or the first bandwidth may be any one of 20 MHz, 40 MHz, 80 MHz, 160 MHz, or 320 MHz, and the second bandwidth may be a maximum bandwidth supported by the first link.

The STR capability information may further include the first bandwidth and the second bandwidth, that is, a bandwidth combination.

In this solution, the interference parameter information is indicated with reference to different bandwidth combinations, and an STR capability on two links may be determined based on different bandwidth combinations, or a required bandwidth combination may be selected to send data based on the STR capability on the two links in different bandwidth combinations in a following communication process.

In an implementation of any one of the foregoing aspects, the interference parameter information may include a maximum interference parameter, the maximum interference parameter is a maximum value of at least one interference parameter corresponding to at least one bandwidth combination, the bandwidth combination includes a bandwidth combination of the bandwidth of the first link and the bandwidth of the second link, and a bandwidth combination including the first bandwidth and the second bandwidth in the at least one bandwidth combination corresponds to a maximum interference parameter.

In this solution, a maximum value of a plurality of interference parameters corresponding to a plurality of bandwidth combinations is used as an interference parameter between the first link and the second link, and the interference parameter is carried in the interference parameter information, so that signaling overheads can be reduced, and one or two interference parameters do not need to be carried for each bandwidth combination.

In an implementation of any one of the foregoing aspects, the STR capability information may include first information and second information, the first information may be used to indicate the interference parameter information between the first link using the first bandwidth and the second link using the second bandwidth, and the second information may be used to indicate STR mode information of the first link using the first bandwidth and the second link using the second bandwidth. The STR mode information may include an STR mode, a non-STR mode, and a conditional STR mode. The conditional STR mode may indicate that a link pair is STR under some conditions, and the link pair is non-STR under some other conditions. It may be understood that the STR mode information indicated by the second information may be the conditional STR mode.

In an implementation of any one of the foregoing aspects, the interference parameter information may be carried in an EHT operation element.

According to a fifth aspect, an embodiment of this application provides an STR capability indication method performed by a first multi-link device. The STR capability indication method includes: The first multi-link device determines an interference parameter between a first link using a first bandwidth and a second link using a second bandwidth, obtains an interference parameter threshold, and determines, by comparing the interference parameter with the interference parameter threshold, whether a simultaneous transmit and receive operation is supported on the first link and the second link; and then sends STR capability indication information, where the STR capability indication information indicates whether the simultaneous transmit and receive operation is supported on the first link and the second link. Correspondingly, after receiving the STR capability indication information, the second device may learn whether the simultaneous transmit and receive operation is supported on the first link and the second link.

Optionally, when the interference parameter is less than the interference parameter threshold, the first multi-link device determines that the first multi-link device supports the simultaneous transmit and receive operation on the first link and the second link; or when the interference parameter is greater than or equal to the interference parameter threshold, the first multi-link device determines that the first multi-link device supports does not support the simultaneous transmit and receive operation on the first link and the second link.

In this solution, whether the simultaneous transmit and receive operation is supported on the first link and the second link can be directly indicated, so that air interface signaling overheads can be reduced, and the second device does not need to perform determining, thereby reducing the complexity of the second device.

According to a sixth aspect, an embodiment of this application provides a communication apparatus in a WLAN. The communication apparatus is a first multi-link device, and may be the first multi-link device, or a chip such as a Wi-Fi chip in the first multi-link device. The communication apparatus includes:

a processing unit, configured to: determine an interference parameter between a first link using a first bandwidth and a second link using a second bandwidth, obtain an interference parameter threshold, and determine, by comparing the interference parameter with the interference parameter threshold, whether a simultaneous transmit and receive operation is supported on the first link and the second link; and a transceiver unit, configured to send STR capability indication information, where the STR capability indication information indicates whether the simultaneous transmit and receive operation is supported on the first link and the second link.

Optionally, when the interference parameter is less than the interference parameter threshold, the processing unit is specifically configured to determine that the simultaneous transmit and receive operation is supported on the first link and the second link; or when the interference parameter is greater than or equal to the interference parameter threshold, the processing unit is specifically configured to determine that the simultaneous transmit and receive operation is not supported on the first link and the second link.

According to a seventh aspect, an embodiment of this application provides a communication apparatus in a WLAN. The communication apparatus is a second device, and may be the second device, or a chip such as a Wi-Fi chip in the second device. The communication apparatus includes:

a transceiver unit, configured to receive STR capability indication information from a first multi-link device, where the STR capability indication information indicates whether a simultaneous transmit and receive operation is supported on a first link and a second link; and a processing unit, configured to determine, based on the STR capability indication information, whether the simultaneous transmit and receive operation is supported on the first link and the second link.

In an implementation of any one of the foregoing aspects, the STR capability indication information may include first indication information and second indication information, the first indication information indicates whether the simultaneous transmit and receive operation is supported on the first link and the second link, and the second indication information indicates interference parameter information between the first link and the second link.

Optionally, the first indication information is carried in an EHT capability element, and the interference parameter information is carried in the EHT operation element.

In this solution, the first indication information directly indicates whether the simultaneous transmit and receive operation is supported on the first link and the second link, and the second indication information indicates the interference parameter information between the two links. Therefore, an STR capability on the two links may be determined based on the first indication information, and a transmit parameter may be selected for a following communication process based on the second indication information. This helps select different communication procedures when different transmit parameters are used.

In an implementation of any one of the foregoing aspects, the simultaneous transmit and receive operation may include a first operation and a second operation, the first operation may be that the first multi-link device transmits a first PPDU on the first link concurrently with receiving a second PPDU on the second link, and the second operation may be that the first multi-link device transmits the second PPDU on the second link concurrently with receiving the first PPDU on the first link.

Optionally, the interference parameter information may include two interference parameters, for example, a first interference parameter and a second interference parameter. The first interference parameter is an interference parameter of the first link to the second link when the first multi-link device performs the first operation. The second interference parameter is an interference parameter of the second link to the first link when the first multi-link device performs the second operation.

In an implementation of any one of the foregoing aspects, the first bandwidth may be a bandwidth of the first PPDU, and the second bandwidth may be a bandwidth of the second PPDU. The bandwidth of the first PPDU and the bandwidth of the second PPDU are any one of the following: 20 MHz, 40 MHz, 80 MHz, 160 MHz, or 320 MHz. It may be understood that a bandwidth of a PPDU may be a bandwidth used when the current PPDU is sent.

In an implementation of any one of the foregoing aspects, the first bandwidth may be a maximum bandwidth supported by the first link, and the second bandwidth may be any one of 20 MHz, 40 MHz, 80 MHz, 160 MHz, or 320 MHz; or the first bandwidth may be any one of 20 MHz, 40 MHz, 80 MHz, 160 MHz, or 320 MHz, and the second bandwidth may be a maximum bandwidth supported by the first link.

In an implementation of any one of the foregoing aspects, the interference parameter information may include a maximum interference parameter, the maximum interference parameter is a maximum value of at least one interference parameter corresponding to at least one bandwidth combination, the bandwidth combination includes a bandwidth combination of the bandwidth of the first link and the bandwidth of the second link, and a bandwidth combination including the first bandwidth and the second bandwidth in the at least one bandwidth combination corresponds to a maximum interference parameter.

According to an eighth aspect, an embodiment of this application provides an STR capability indication method performed by a first multi-link device. The STR capability indication method includes: The first multi-link device determines signal to interference plus noise ratio (SINR) parameter measured by the first multi-link device when the first multi-link device performs simultaneous transmission and reception on a first link and a second link, and may send the SINR parameters, where the SINR parameters are used to determine whether the first multi-link device supports a simultaneous transmit and receive operation on the first link and the second link. "The first multi-link device performs simultaneous transmission and reception on a first link and a second link" means that the first multi-link device performs transmission on the first link concurrent with reception on the second link, or the first multi-link device performs transmission on the second link concurrent with reception on the first link.

In this solution, SINR parameters on two links are indicated, and whether the first multi-link device supports a simultaneous transmit and receive operation on the two links is determined based on the SINR parameters. That is, an STR capability on the two links is determined, so that when the multi-link device does not support the simultaneous transmit and receive operation, a simultaneous transmit and receive manner can be avoided, thereby laying a communication foundation for subsequent data communication.

According to a ninth aspect, an embodiment of this application provides an STR capability indication method performed by a second device. The STR capability indication method includes: The second device receives SINR parameters from a first multi-link device, where the SINR parameters are measured by the first multi-link device when the first multi-link device performs simultaneous transmission and reception on a first link and a second link; and the second device determines, based on the received SINR parameters, whether the first multi-link device supports a simultaneous transmit and receive operation on the first link and the second link. "The first multi-link device performs simultaneous transmission and reception on a first link and a second link" means that the first multi-link device performs transmission on the first link concurrent with reception on the second link, or the first multi-link device performs transmission on the second link concurrent with reception on the first link.

According to a tenth aspect, an embodiment of this application provides a communication apparatus in a WLAN. The communication apparatus is a first multi-link device, and may be the first multi-link device, or a chip such as a Wi-Fi chip in the first multi-link device. The communication apparatus includes:

a processing unit, configured to determine SINR parameters measured by the first multi-link device when the first multi-link device performs simultaneous transmission and reception on a first link and a second link; and a transceiver unit, configured to send the SINR parameters, where the SINR parameters are used to determine whether the first multi-link device supports a simultaneous transmit and receive operation on the first link and the second link.

According to an eleventh aspect, an embodiment of this application provides a communication apparatus in a WLAN. The communication apparatus is a second device, and may be the second device, or a chip such as a Wi-Fi chip in the second device. The communication apparatus includes:

a transceiver unit, configured to receive SINR parameters from a first multi-link device, where the SINR parameters are measured by the first multi-link device when the first multi-link device performs simultaneous transmission and reception on a first link and a second link; and a processing unit, configured to determine, based on the received SINR parameters, whether the first multi-link device supports a simultaneous transmit and receive operation on the first link and the second link.

In an implementation of any one of the foregoing aspects, the SINR parameters include an SINR value, and the SINR value may be a maximum value of an SINR value of the first link and an SINR value of the second link.

Optionally, the SINR parameters further include an SINR threshold.

Optionally, the second device may determine, by comparing the SINR value with the SINR threshold, whether the first multi-link device supports the simultaneous transmit and receive operation on the first link and the second link. Specifically, when the SINR value is greater than the SINR threshold, the second device determines that the first multi-link device supports the simultaneous transmit and receive operation on the first link and the second link. When the SINR value is less than or equal to the SINR threshold, the second device determines that the first multi-link device does not support the simultaneous transmit and receive operation on the first link and the second link.

In an implementation of any one of the foregoing aspects, the SINR parameters include an SINR margin. A physical meaning of the SINR margin is a difference between the SINR value and the SINR threshold.

In an implementation of any one of the foregoing aspects, the simultaneous transmit and receive operation may include a first operation and a second operation, the first operation may be that the first multi-link device transmits a first PPDU on the first link concurrently with receiving a second PPDU on the second link, and the second operation may be that the first multi-link device transmits the second PPDU on the second link concurrently with receiving the first PPDU on the first link.

In an implementation of any one of the foregoing aspects, the SINR parameters include a first SINR parameter and a second SINR parameter, the first SINR parameter is an SINR parameter of the first link to the second link when the first multi-link device performs a first operation, the second SINR parameter is an SINR parameter of the second link to the first link when the first multi-link device performs the second operation.

Optionally, the first SINR parameter includes a first SINR value, and the second SINR parameter includes a second SINR value.

In an implementation of any one of the foregoing aspects, the SINR parameters further include one SINR threshold or two SINR thresholds, for example, a first SINR threshold and a second SINR threshold. The first SINR threshold is an SINR threshold of the first link to the second link when the first multi-link device performs the first operation, and the second SINR threshold is an SINR threshold of the second link to the first link when the first multi-link device performs the second operation.

In an implementation of any one of the foregoing aspects, the SINR parameter may include a first SINR margin, the second SINR parameter includes a second SINR margin, the first SINR margin is a difference between the first SINR value and the first SINR threshold, and the second SINR margin is a difference between the second SINR value and the second SINR threshold.

According to a twelfth aspect, an embodiment of this application provides a communication apparatus. The communication apparatus is specifically a first multi-link device or a chip or a processing system in the first multi-link device. The communication apparatus includes a processor and a transceiver. The processor is configured to support the first multi-link device in performing a corresponding function in the foregoing method. The transceiver is configured to: support communication between the first multi-link device and a second device, and send information, a frame, a data packet, instructions, or the like in the foregoing method to the second device. The first multi-link device may further include a memory. The memory is configured to be coupled to the processor, and the memory stores program instructions and data that are necessary for the first multi-link device.

According to a thirteenth aspect, an embodiment of this application provides a communication apparatus. The communication apparatus is specifically a second device or a chip or a processing system in the second device. The communication apparatus includes a processor and a transceiver. The processor is configured to support the second device in performing a corresponding function in the foregoing method. The transceiver is configured to support communication between the second device and a first multi-link device, and receive information, a frame, a data packet, instructions, or the like in the foregoing method that are sent by the first multi-link device. The second device may further include a memory. The memory is configured to be coupled to the processor, and the memory stores program instructions and data that are necessary for the second device.

According to a fourteenth aspect, an embodiment of this application provides a wireless communication system. The system includes the first multi-link device according to the twelfth aspect and the second device according to the thirteenth aspect.

According to a fifteenth aspect, an embodiment of this application provides a chip or a chip system, including an input/output interface and a processing circuit. The input/output interface is configured to exchange information or data, and the processing circuit is configured to run instructions, to enable an apparatus installed with the chip or the chip system to perform the STR capability indication method in any one of the foregoing aspects.

According to a sixteenth aspect, this application provides a computer-readable storage medium. The computer-readable storage medium stores instructions, and the instructions may be executed by one or more processors on a processing circuit. When the instructions are run on a computer, the computer is enabled to perform the STR capability indication method in any one of the foregoing aspects.

According to a seventeenth aspect, this application provides a computer program product including instructions. When the product runs on a computer, the computer is enabled to perform the STR capability indication method in any one of the foregoing aspects.

According to an eighteenth aspect, this application provides a chip system. The chip system includes a processor, configured to support an apparatus installed with the chip system in implementing the STR capability indication method in any one of the foregoing aspects, for example, generating or processing a frame and/or information in the STR capability indication method. In a possible design, the chip system further includes a memory. The memory is configured to store program instructions and data that are necessary for a communication apparatus. The chip system may include a chip, or may include a chip and another discrete component.

In the embodiments of this application, whether a multi-link device supports a simultaneous transmit and receive operation on one link pair (that is, two links) may be indicated, thereby laying a communication foundation for subsequent data communication.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

Figure 1:
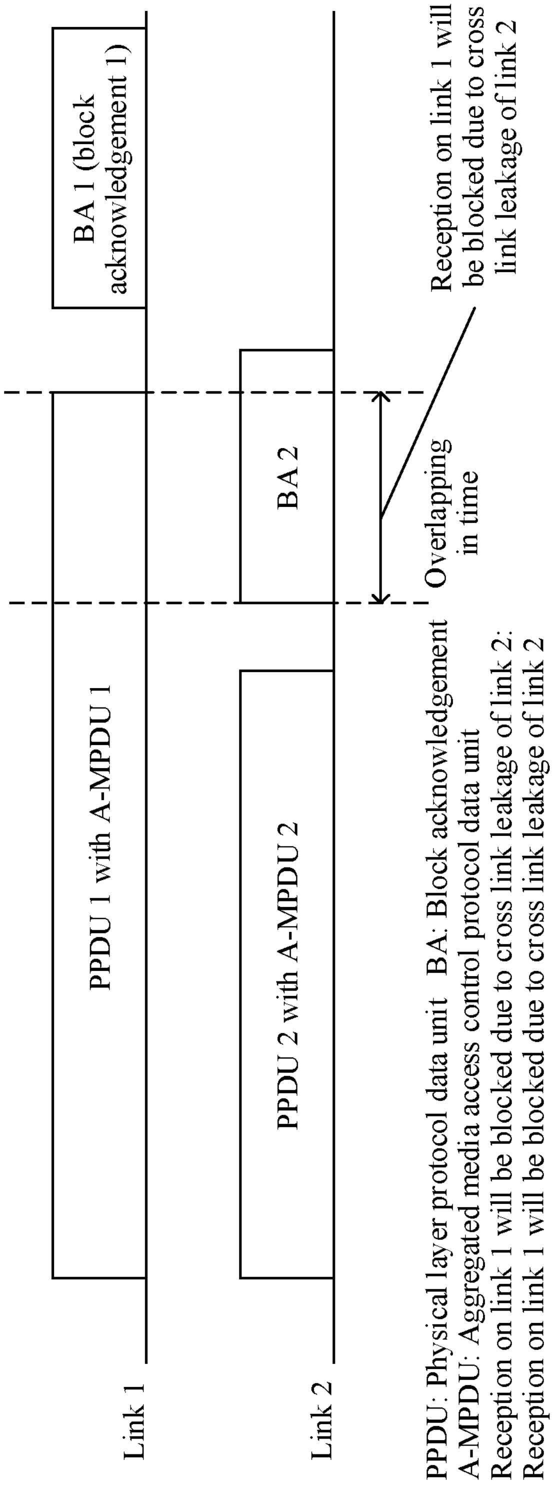
FIG. 1 is a schematic diagram of mutual interference in a non-STR multi-link device in a plurality of frequency bands.

The following clearly and completely describes the technical solutions in the embodiments of this application with reference to the accompanying drawings in the embodiments of this application.

For ease of understanding the technical solutions in the embodiments of this application, the following briefly describes a system architecture and/or an application scenario of an STR capability indication method provided in the embodiments of this application. It may be understood that the system architecture and/or the scenario described in the embodiments of this application are/is intended to describe the technical solutions in the embodiments of this application more clearly, and do/does not constitute a limitation on the technical solutions provided in the embodiments of this application.

The embodiments of this application provide an STR capability indication method performed in a wireless communication system, to indicate whether a multi-link device supports a simultaneous transmit and receive operation on one link pair (that is, two links), thereby laying a communication foundation for subsequent data communication. The wireless communication system may be a wireless local area network or a cellular network. The STR capability indication method may be implemented by a communication device in the wireless communication system or a chip or a processor in the communication device. The communication device may be a wireless communication device that supports concurrent transmission on a plurality of links. For example, the communication device may be referred to as a multi-link device or a multi-band device. Compared with a communication device that supports only single-link transmission, the multi-link device has higher transmission efficiency and a higher throughput.

The multi-link device includes one or more affiliated stations (affiliated STAs). The affiliated station is a logical station and may work on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device (AP MLD), and a multi-link device whose affiliated station is a non-AP STA may be referred to as a multi-link non-AP, a multi-link non-AP device, or a non-AP multi-link device (Non-AP MLD). For ease of description, "the multi-link device includes an affiliated station" is also briefly described as "the multi-link device includes a station" in the embodiments of this application.

The multi-link device includes one or more affiliated stations (affiliated STAs). In other words, one multi-link device may include a plurality of logical stations. Each logical station works on one link, but a plurality of logical stations can work on a same link. During data transmission, an AP MLD and a non-AP MLD may use a link identifier to identify a link or a station on a link. Before communication, the AP MLD and the non-AP MLD may first negotiate or communicate with each other on a correspondence between a link identifier and a link or a station on a link. Therefore, during data transmission, the link identifier is carried without transmitting a large amount of signaling information to indicate the link or the station on the link. This reduces signaling overheads and improves transmission efficiency.

In an example, when the AP MLD establishes a basic service set (BSS), a sent management frame, for example, a beacon frame, carries elements including a plurality of link identifier information fields. Each link identifier information field includes a link identifier, and further includes one or more of a BSS identifier, an operation set, and a channel number. The one or more of the BSS identifier, the operation set, and the channel number correspond to the link identifier. In another example, in a process of establishing a multi-link association, the AP MLD and the non-AP MLD negotiate on a plurality of link identifier information fields. In subsequent communication, the AP MLD or non-AP MLD uses link identifiers to represent stations at both ends of a corresponding link. The link identifier may further represent one or more attributes of a MAC address, a working operation set, and a channel number of the station. The MAC address may also be replaced with an association identifier (AID) of an associated AP MLD.

If a plurality of stations work on one link, the link identifier (which is a numeric ID) not only represents an operation set and a channel number in which the link is located, but also represents an identifier of a station working on the link, for example, a MAC address or an association identifier AID of the station.

The multi-link device may implement wireless communication in compliance with the IEEE 802.11 series protocols. For example, the multi-link device may be a station in compliance with the extremely high throughput rate, based on IEEE 802.11be, or compatible with IEEE 802.11be, to implement communication with other devices. Certainly, the other devices may be multi-link devices, or may not be multi-link devices.

The STR capability indication method provided in the embodiments of this application may be used in a scenario in which one node communicates with one or more nodes, may be used in a single-user uplink/downlink communication scenario or a multi-user uplink/downlink communication scenario, or may be used in a device to device (D2D) communication scenario.

Any one of the foregoing nodes may be an AP MLD, or a non-AP MLD. For example, the STR capability indication method is used in a scenario in which an AP MLD communicates with a non-AP MLD, used in a scenario in which a non-AP MLD communicates with a non-AP MLD, or used in a scenario in which an AP MLD communicates with an AP MLD. This is not limited in the embodiments of this application. Optionally, one of the foregoing nodes may be a multi-link device, and the other nodes may be multi-link devices, or may not be multi-link devices. For example, the method is used in a scenario in which an AP MLD communicates with a single-link device, or used in a scenario in which a non-AP MLD communicates with a single-link device. This is not limited in the embodiments of this application. The single-link device may be an AP or a STA.

For ease of description, a scenario in which an AP communicates with a STA is used as an example below to describe the system architecture of this application. It may be understood that the AP herein has a broad meaning and refers to an AP side, and may be a single-link AP or an AP MLD. Similarly, the STA herein also has a broad meaning and refers to a STA side, and may be a single-link STA or a non-AP MLD.

Figure 2:
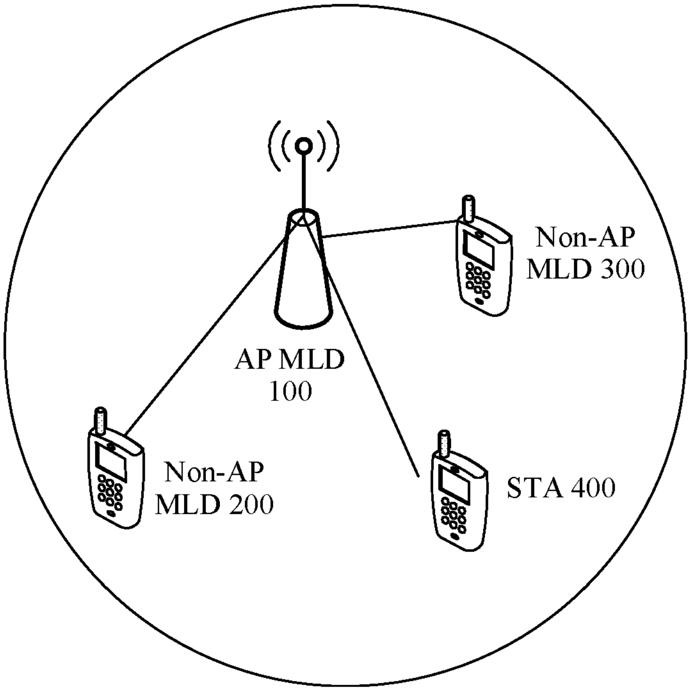
FIG. 2 is a schematic architectural diagram of a wireless communication system according to an embodiment of this application.

FIG. 2 is a schematic architectural diagram of a wireless communication system according to an embodiment of this application. FIG. 2 uses a wireless local area network as an example to describe an application scenario according to an embodiment of this application. The wireless communication system shown in FIG. 2 includes an AP multi-link device 100 and a non-AP multi-link device 200. The AP multi-link device is a multi-link device that provides a service for the non-AP multi-link device, and the non-AP multi-link device may communicate with the AP multi-link device by using a plurality of links, so as to improve a throughput rate. Certainly, the wireless communication system may further include other devices, for example, a non-AP multi-link device 300 and a single-link STA 400. The quantity of AP multi-link devices and the quantity of non-AP multi-link devices in FIG. 2 are merely an example.

Figure 3A:
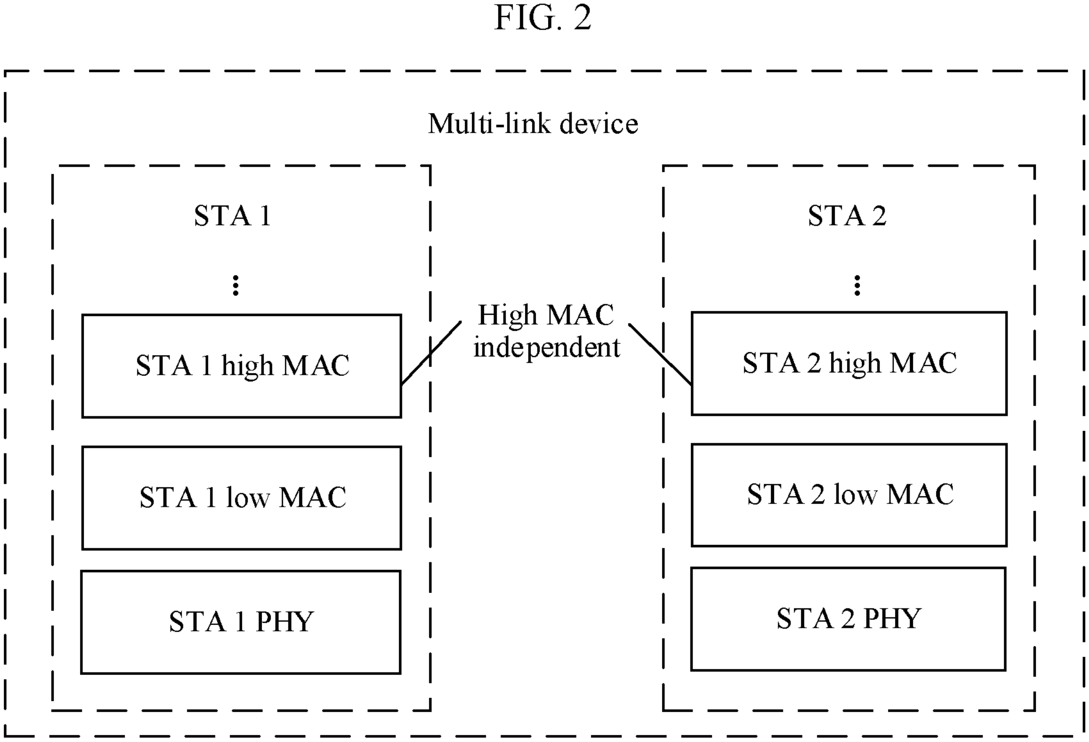
FIG. 3*a* is a schematic diagram of a structure of a multi-link device according to an embodiment of this application.
Figure 3B:
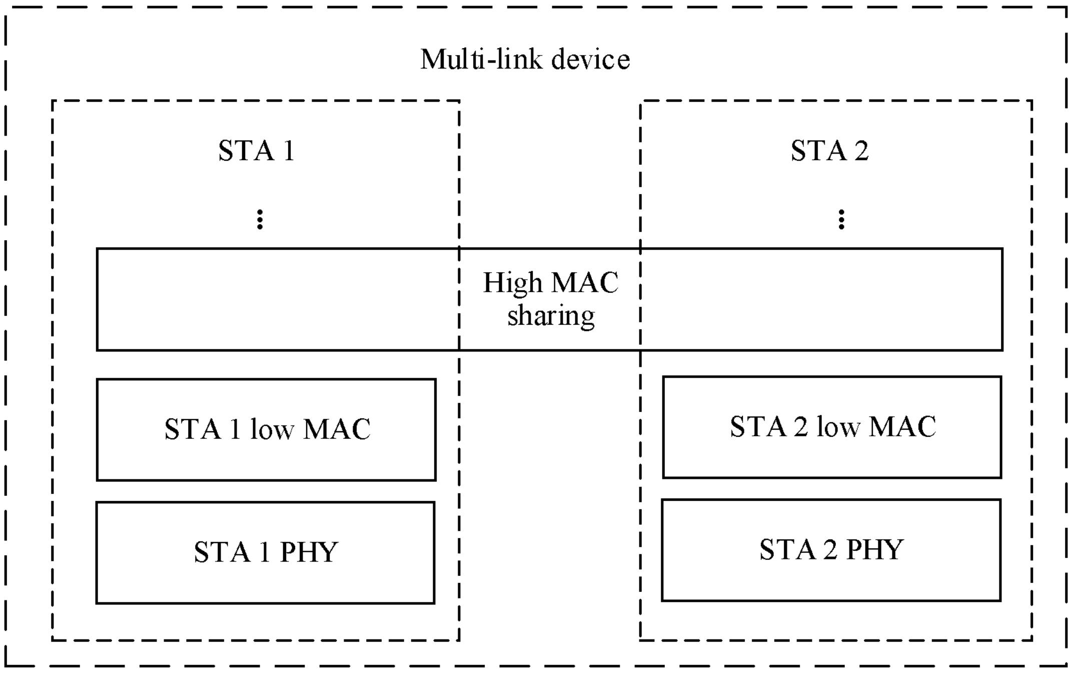
FIG. 3*b* is a schematic diagram of another structure of a multi-link device according to an embodiment of this application.

Optionally, FIG. 3*a* is a schematic diagram of a structure of a multi-link device according to an embodiment of this application. The IEEE 802.11 standard focuses on an 802.11 physical layer (PHY) part and a media access control (MAC) layer part in a multi-link device. As shown in FIG. 3*a*, a plurality of STAs included in the multi-link device are independent of each other at a low MAC layer and a PHY layer, and are also independent of each other at a high MAC layer. FIG. 3*b* is a schematic diagram of another structure of a multi-link device according to an embodiment of this application. As shown in FIG. 3*b*, a plurality of STAs included in the multi-link device are independent of each other at a low MAC layer and a PHY layer, and share a high MAC layer. Certainly, in a multi-link communication process, a non-AP multi-link device may use a structure in which high MAC layers are independent of each other, and an AP multi-link device uses a structure in which high MAC layers are shared. Alternatively, a non-AP multi-link device may use a structure in which high MAC layers are shared, and an AP multi-link device use a structure in which high MAC layers are independent of each other. Alternatively, both a non-AP multi-link device and an AP multi-link device may use a structure in which high MAC layers are shared. Alternatively, a non-AP multi-link device and an AP multi-link device may both use a structure in which high MAC layers are independent of each other. A schematic diagram of an internal structure of the multi-link device is not limited in this embodiment of this application. FIG. 3*a* and FIG. 3*b* are merely examples for description. For example, the high MAC layer or the low MAC layer may be implemented by one processor in a chip system of the multi-link device, or may be separately implemented by different processing modules in a chip system.

For example, the multi-link device in this embodiment of this application may be a single-antenna device, or a multi-antenna device. For example, the device may be a device with more than two antennas. The quantity of antennas included in the multi-link device is not limited in this embodiment of this application. In the embodiments of this application, the multi-link device may allow services of the same access type to be transmitted on different links, or even allow same data packets to be transmitted on different links. Alternatively, the multi-link device may not allow services of the same access type to be transmitted on different links, but may allow services of different access types to be transmitted on different links.

A frequency band in which the multi-link device works may include one or more frequency bands of sub 1 GHz, 2.4 GHz, 5 GHz, 6 GHz, and a high frequency 60 GHz.

Figure 4A:
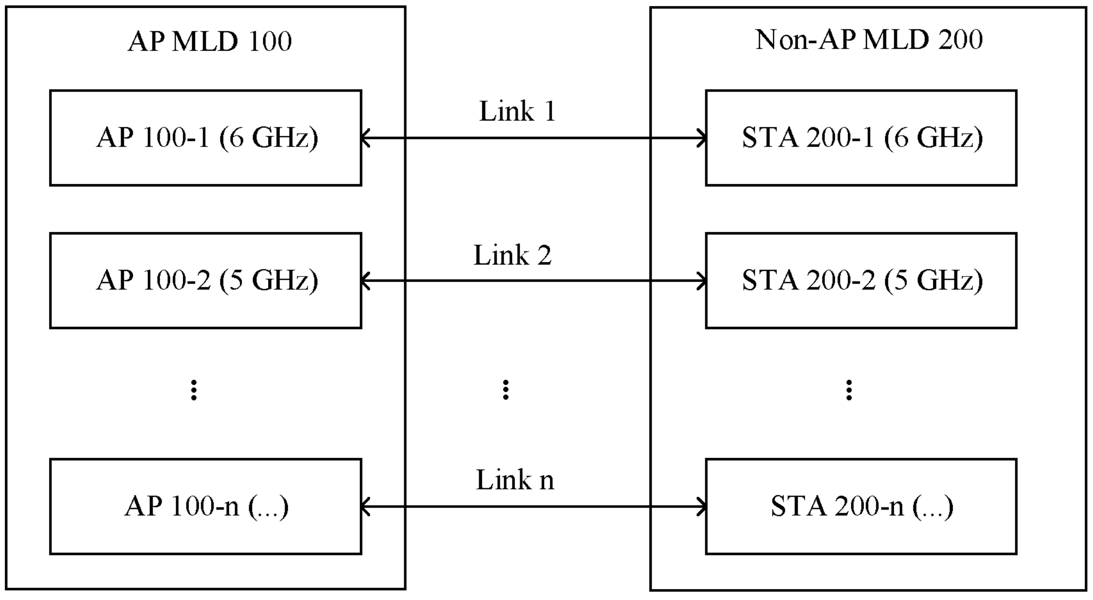
FIG. 4*a* is a schematic diagram of multi-link communication according to an embodiment of this application.

Optionally, FIG. 4*a* is a schematic diagram of multi-link communication according to an embodiment of this application. FIG. 4*a* is a schematic diagram of communication between AP MLD 100 and non-AP MLD 200. As shown in FIG. 4*a*, AP MLD 100 includes n affiliated stations: AP 100-1, AP 100-2, . . . , and AP 100-*n*. The non-AP MLD 200 includes n affiliated stations: STA 200-1, STA 200-2, . . . , and STA 200-*n*. AP MLD 100 and non-AP MLD 200 communicate concurrently through link 1, link 2, . . . , and link n. An AP in an AP MLD may establish a link with a STA in a non-AP MLD for communication. For example, AP 100-1 in AP MLD 100 establishes link 1 with STA 200-1 in non-AP MLD 200 for communication, AP 100-2 in AP MLD 100 establishes link 2 with STA 200-2 in non-AP MLD 200 for communication, and so on. Similarly, for communication between AP MLDs and communication between non-AP MLDs, refer to communication between an AP MLD and a non-AP MLD. Details are not described herein again.

Figure 4B:
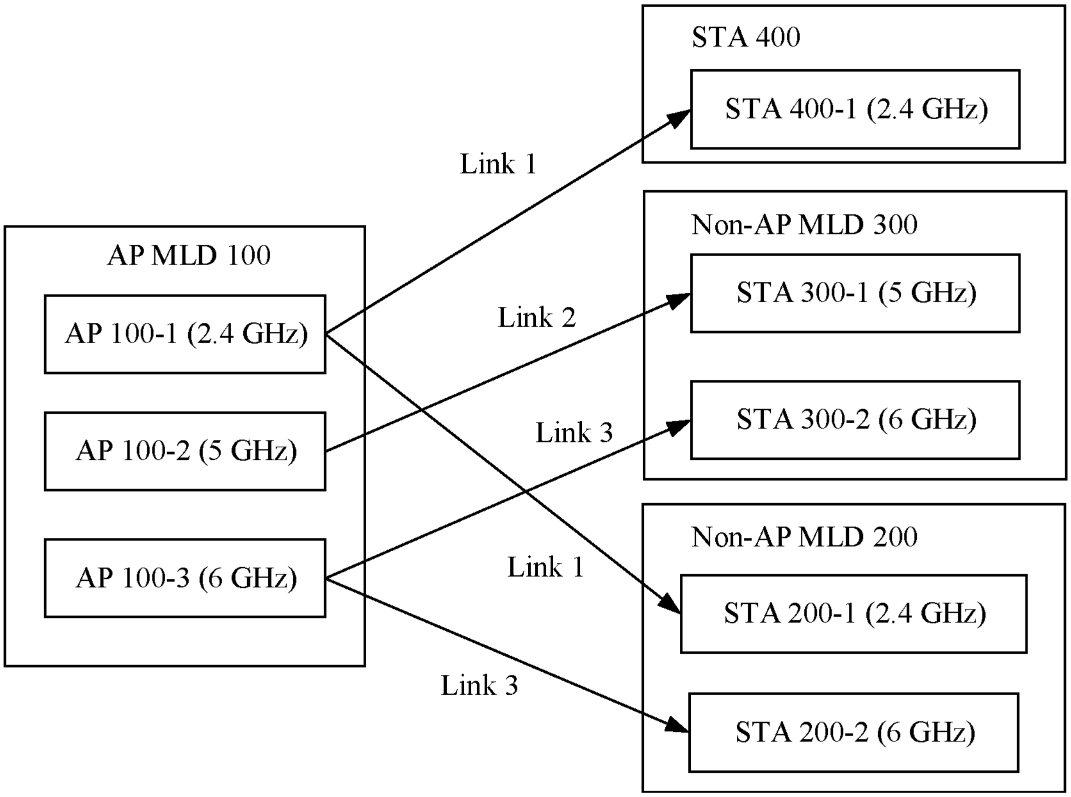
FIG. 4*b* is another schematic diagram of multi-link communication according to an embodiment of this application.

FIG. 4*b* is another schematic diagram of multi-link communication according to an embodiment of this application. FIG. 4*b* is a schematic diagram in which AP MLD 100 communicates with non-AP MLD 200, non-AP MLD 300, and STA 400. As shown in FIG. 4*b*, it is assumed that AP MLD 100 includes three affiliated stations: AP 100-1 to AP 100-3. Non-AP MLD 200 includes two affiliated stations: STA 200-1 and STA 200-2. Non-AP MLD 300 includes two affiliated stations: STA 300-1 and STA 300-2. STA 400 is a single-link device. AP MLD 100 may separately communicate with non-AP MLD 200 through link 1 and link 3, communicate with non-AP MLD 300 through link 2 and link 3, and communicate with STA 400 through link 1.

In an example, STA 400 works in a 2.4 GHz frequency band. STA 300-1 included in non-AP MLD 300 works in a 5 GHz frequency band, and STA 300-2 included in non-AP MLD 300 works in a 6 GHz frequency band. STA 200-1 included in non-AP MLD 200 works in a 2.4 GHz frequency band, and STA 200-2 included in non-AP MLD 200 works in a 6 GHz frequency band. AP 100-1 that works in the 2.4 GHz frequency band and that is in AP MLD 100 may transmit uplink or downlink data to STA 400 and STA 200-2 in non-AP MLD 200 through link 1. AP 100-2 that works in the 5 GHz frequency band and that is in AP MLD 100 may transmit uplink or downlink data to STA 300-1 that works in the 5 GHz frequency band and that is in non-AP MLD 300 through link 2. AP 100-3 that works in the 6 GHz frequency band and that is in AP MLD 100 may transmit uplink or downlink data to STA 200-2 that works in the 6 GHz frequency band and that is in non-AP MLD 200 through link 3, or may transmit uplink or downlink data to STA 300-2 in non-AP MLD 300 through link 3.

It may be understood that FIG. 4*a* and FIG. 4*b* describe examples of frequency bands supported by the AP MLD, but in actual application, the AP MLD and the non-AP MLD may further support more or fewer frequency bands. That is, the AP MLD and the non-AP MLD may work on more links or fewer links. This is not limited in the embodiments of this application.

For example, the multi-link device (such as any one of the multi-link devices AP MLD 100, non-AP MLD 200, and non-AP MLD 300 in FIG. 2) is an apparatus having a wireless communication function. The apparatus may be a complete device, a chip, a processing system, or the like installed in the complete device. The device installed with the chip or the processing system can implement the method and the function in the embodiments of this application under control of the chip or the processing system. For example, the non-AP multi-link device in the embodiments of this application has a wireless transceiver function, may support the 802.11 series protocols, and may communicate with the AP multi-link device or another non-AP multi-link device. For example, the non-AP multi-link device is any user communication device that allows a user to communicate with an AP and then communicate with a WLAN. For example, the non-AP multi-link device may be user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, may be an internet of things node in the internet of things, or may be a vehicle-mounted communication apparatus in the internet of vehicles. The non-AP multi-link device may alternatively be a chip and a processing system in the foregoing terminals. The AP multi-link device in the embodiments of this application is an apparatus that serves the non-AP multi-link device, and may support the 802.11 series protocols. For example, the AP multi-link device may be a communication entity such as a communication server, a router, a switch, or a bridge, or the AP multi-link device may include various forms of macro base stations, micro base stations, relay stations, and the like. Certainly, the AP multi-link device may alternatively be chips and processing systems in the various forms of devices, to implement the method and function in the embodiments of this application.

It can be understood that the multi-link device may support high-rate and low-latency transmission. With continuous evolution of application scenarios of a wireless local area network, the multi-link device may be further used in more scenarios, for example, a sensor node (for example, a smart meter, a smart electricity meter, and a smart air detection node) in a smart city, a smart device (for example, a smart camera, a projector, a display, a TV, a stereo, a refrigerator, and a washing machine) in smart home, a node in the internet of things, an entertainment terminal (for example, a wearable device such as an AR and a VR), a smart device (such as a printer and a projector) in a smart office, an IoV device in the internet of vehicles, and some infrastructures (for example, a vending machine, a self-service navigation station of a supermarket, a self-service cash register device, and a self-service ordering machine) in daily life scenarios. Specific forms of the non-AP multi-link device and the AP multi-link device are not limited in the embodiments of this application, and are merely described as examples herein. The 802.11 protocol may be a protocol that supports 802.11be or is compatible with 802.11be.

It is clear that the multi-link device performs concurrent communication on a plurality of links, so that a transmission rate is greatly improved. However, some multi-link devices do not support a simultaneous transmit and receive operation on two or more links. Therefore, before communication, both communication parties need to know whether a peer end supports a simultaneous transmit and receive operation. This can avoid a failure in communication between two devices when a device communicates, in a simultaneous transmit and receive manner, with another device that does not support a simultaneous transmit and receive operation.

Therefore, this application provides an STR capability indication method, to determine, based on STR capability information sent by a multi-link device, whether the multi-link device supports a simultaneous transmit and receive operation on two links, thereby laying a communication foundation for subsequent data communication. This can avoid that a device communicates, in a simultaneous transmit and receive manner, with another device that does not support a simultaneous transmit and receive operation, thereby improving a communication success rate.

Before the STR capability indication method in this application is described, factors that affect an STR capability between two links is first described. In a sending process on one link, whether reception cannot be correctly performed on the other link is related to a setting parameter for sending a physical layer protocol data unit (PPDU) and a setting parameter for receiving the PPDU. For ease of description, in the following description, it is assumed that a message sent on one link is PPDU 1, and a message received on the other link is PPDU 2. It may be understood that the "STR capability" mentioned in this application includes supporting STR and not supporting STR, or supporting a simultaneous transmit and receive operation and not supporting a simultaneous transmit and receive operation.

The factors that affect the STR capability include related parameters of PPDU 2 and transmit parameters of PPDU 1. The related parameters that are of PPDU 2 and that affect the STR capability include but are not limited to one or more of the following: a bandwidth, transmit power, a modulation and coding scheme (MCS), a spatial distance between the AP MLD and the non-AP MLD. For example, when the bandwidth of PPDU 2 is large, a frequency spacing between two links is small, and sending of PPDU 1 may affect reception of PPDU 2, causing an error in the reception of PPDU 2. On the contrary, when the bandwidth of PPDU 2 is small, a frequency spacing between two links is large, and sending of PPDU 1 may not affect reception of PPDU 2. For another example, when the transmit power of PPDU 2 is large, an SINR of a receive end is high, and PPDU 2 can be correctly received. On the contrary, when the transmit power of PPDU 2 is small, an SINR of a receive end is low, and PPDU 2 cannot be correctly received. For still another example, when a low MCS is used, PPDU 2 can be correctly received by the receive end at a low SINR. On the contrary, when a high MCS is used, PPDU 2 cannot be correctly received by the receive end at a low SINR. For yet another example, when the AP MLD and the non-AP MLD are close, PPDU 2 has a high SINR and can be correctly received. On the contrary, when the AP MLD is far away from the non-AP MLD, PPDU 2 has a low SINR, and a reception error is caused.

The transmit parameters that are of PPDU 1 and that affect the STR capability include a bandwidth and transmit power. For example, when the bandwidth of PPDU 1 is large, a frequency spacing between two links is small, and sending of PPDU 1 may affect reception of PPDU 2, causing an error in the reception of PPDU 2. On the contrary, when the bandwidth of PPDU 1 is small, a frequency spacing between two links is large, and sending of PPDU 1 may not affect reception of PPDU 2. For another example, when the transmit power of PPDU 1 is large, strength of a signal leaked to another link is large, and a failure in reception of PPDU 2 is caused. On the contrary, when the transmit power of PPDU 1 is small, strength of a signal leaked to another link is small, and reception of PPDU 2 is not affected.

The STR capability indication method provided in this application is described in detail below in this application with reference to one or more factors that affect the STR capability and more accompanying drawings.

It may be understood that a first multi-link device in this application may be the AP multi-link device in FIG. 2, or the non-AP multi-link device in FIG. 2. A second device may be a multi-link device, or maybe a single-link device. If the second device is a multi-link device, the second device may be an AP multi-link device, or a non-AP multi-link device. This is not limited in the embodiments of this application. For ease of subsequent description, a scenario in which two MLDs communicate through two or more links is used as an example for description in this application. In the following embodiments, two links are used as an example to describe the technical solutions of this application. However, the technical solutions of this application are also applicable to two MLDs that support a plurality of links. Specifically, the technical solutions of this application are applicable to any two of a plurality of links, or applicable to two links with greatest interference among a plurality of links. The interference parameter or STR capability of the two links with greatest interference is used as an interference parameter or STR capability of the MLD.

For ease of understanding, the foregoing two MLDs may be an AP MLD and a non-AP MLD. The following embodiments are described by using an example in which the first multi-link device is a non-AP multi-link device and the second device is an AP multi-link device. It may be understood that, in actual application, the first multi-link device may alternatively be an AP multi-link device, and the second device is a non-AP multi-link device.

It may be understood that a first link in this application may be a transmit link or a receive link. Similarly, a second link may be a receive link or a transmit link. The first link is a transmit link, and the second link is a receive link. The first link is a receive link, and the second link is a transmit link.

It may be understood that "simultaneous transmit and receive" and "STR" mentioned in this application both mean that transmission is performed on one link and reception is performed on another link. Therefore, "simultaneous transmit and receive" and "STR" in this application may be used interchangeably. It may be further understood that "simultaneous transmit and receive" and "STR" in this application may also refer to concurrent communication, that is, a multi-link device may perform transmission on one link and concurrently perform reception on another link. In this case, that a multi-link device supports "simultaneous transmit and receive" or "STR" may mean that a multi-link device supports a transmission manner of transmission on one link concurrent with reception on the other link for each pair of links (An MLD supports transmission on one link concurrent with reception on the other link for each pair of links).

In the embodiments of this application, "simultaneous transmit and receive" or "simultaneous" does not mean that a start time point and an end time point of sent data are strictly the same as those of received data, and may mean that there is a non-empty intersection in time between a PPDU in a first bandwidth and a PPDU in a second bandwidth. For example, the multi-link device sends PPDU 1 on the first link and receives PPDU 2 on the second link. The multi-link device supports "simultaneous transmit and receive" or "STR", which means that the multi-link device supports a transmission manner in which there is a non-empty intersection between a transmission time of PPDU 1 and a transmission time of PPDU 2.

Embodiment 1

According to the STR capability indication method provided in the embodiments of this application, a bidirectional interference parameter or an STR capability of a link pair may be indicated when inter-link interference is asymmetric.

Figure 5:
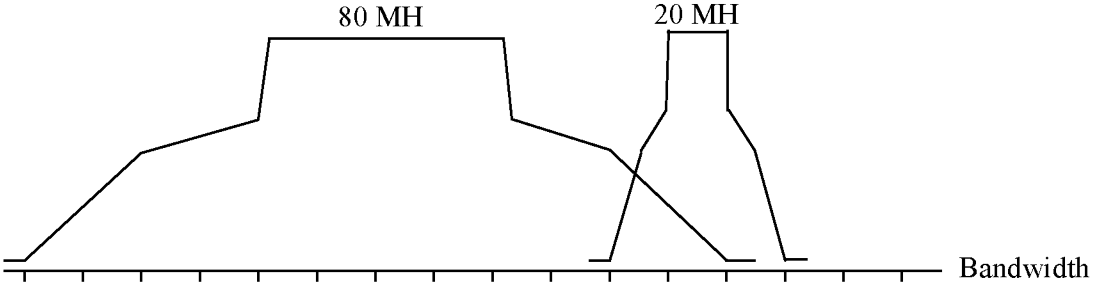
FIG. 5 is a schematic diagram of a spectrum template of different bandwidths according to an embodiment of this application.

It may be understood that inter-link interference asymmetry means that interference caused by transmission on one link to reception on another link is different from interference caused by transmission on the another link to reception on this link. For example, in some cases, sending a PPDU on one link (for example, link 1) interferes with receiving a PPDU on another link (for example, link 2). However, sending a PPDU on the another link (for example, link 2) may not interfere with receiving a PPDU on this link (for example, link 1). The inter-link interference asymmetry is usually related to factors such as a bandwidth and transmit power on two links. FIG. 5 is a schematic diagram of a spectrum template of different bandwidths according to an embodiment of this application. FIG. 5 shows a cause of the inter-link interference asymmetry when two links use different bandwidths. It is assumed that a bandwidth of 80 MHz is used on link 1, and a bandwidth of 20 MHz is used on link 2. It can be learned from the spectrum template shown in FIG. 5 (a spectrum template specified in the standard is used herein, and a spectrum template in actual products may be different, but an attenuation trend is similar) that, when the bandwidth is large, the out-of-band interference attenuation changes slowly with the frequency. When the bandwidth is small, the out-of-band interference attenuation changes quickly with the frequency. Therefore, sending the PPDU on link 1 interferes with receiving the PPDU on link 2, but sending the PPDU on link 2 may not interfere with receiving the PPDU on link 1, that is, the link interference is asymmetric.

Similarly, when a non-AP MLD uses high power to send the PPDU on link 1, and an AP MLD uses low power to send the PPDU on link 2, sending the PPDU on link 1 may interfere with receiving the PPDU on link 2, but sending the PPDU on link 2 does not interfere with receiving the PPDU on link 1, that is, the link interference is asymmetric.

Figure 6:
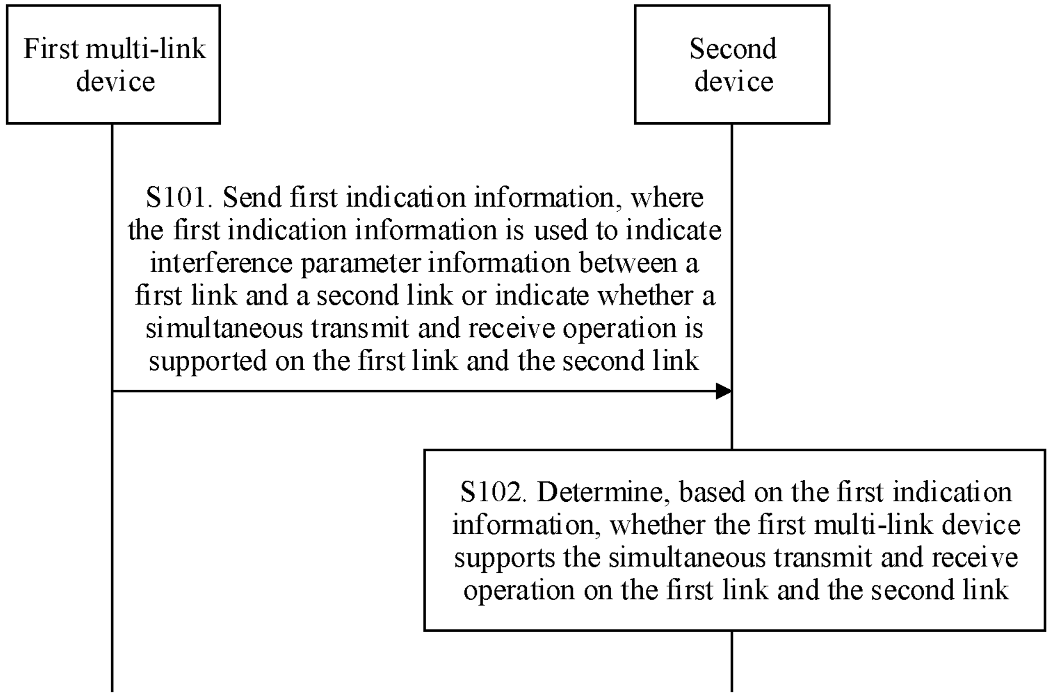
FIG. 6 is a first schematic flowchart of an STR capability indication method according to an embodiment of this application.

FIG. 6 is a first schematic flowchart of an STR capability indication method according to an embodiment of this application. As shown in FIG. 6, the STR capability indication method includes but is not limited to the following steps.

S101. A first multi-link device sends first indication information, where the first indication information indicates interference parameter information between a first link and a second link or indicate whether a simultaneous transmit and receive operation is supported on the first link and the second link. Correspondingly, a second device receives the first indication information from the first multi-link device.

S102. The second device determines, based on the first indication information, whether the first multi-link device supports the simultaneous transmit and receive operation on the first link and the second link.

In other words, the second device may determine, based on the first indication information, an STR capability of the first multi-link device for the first link and the second link.

It may be understood that if the first multi-link device is a non-AP MLD, and the second device is a single-link device AP or an AP MLD, the non-AP MLD may report the first indication information to the single-link device AP or the AP MLD. Correspondingly, the single-link device AP or the AP MLD receives the first indication information. Similarly, if the first multi-link device is an AP MLD, and the second device is a single-link device STA or a non-AP MLD, the AP MLD may broadcast the first indication information. Correspondingly, all single-link devices STAs or non-AP MLDs associated with the AP MLD receive the first indication information. The following separately describes content indicated by the first indication information.

1. The first indication information indicates the interference parameter information between the first link and the second link.

Optionally, the interference parameter information may include a first interference parameter and a second interference parameter. The foregoing simultaneous transmit and receive operation may include a first operation and a second operation. The first operation may be that the first multi-link device transmits a PPDU on the first link concurrently with receiving a PPDU on the second link. The second operation may be that the first multi-link device transmits a PPDU on the second link concurrently with receiving a PPDU on the first link. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a cross-link interference parameter of the first link to the second link. The second interference parameter may be described as a cross-link interference parameter of the second link to the first link.

After receiving the first indication information, the second device may obtain the first interference parameter and the second interference parameter that are indicated by the first indication information. The second device may obtain an interference parameter threshold, compare the first interference parameter with the interference parameter threshold, and compare the second interference parameter with the interference parameter threshold. If the first interference parameter is greater than the interference parameter threshold, the second device may determine that the first multi-link device does not support the first operation, that is, the first multi-link device does not support sending the PPDU on the first link concurrently with receiving the PPDU on the second link. If the first interference parameter is less than the interference parameter threshold, the second device may determine that the first multi-link device supports the first operation, that is, the first multi-link device supports sending the PPDU on the first link concurrently with receiving the PPDU on the second link. If the first interference parameter is equal to the interference parameter threshold, the second device may determine that the first multi-link device supports the first operation, or may determine that the first multi-link device does not support the first operation. In actual application, when the first interference parameter is equal to the interference parameter threshold, whether the first multi-link device supports the first operation may be set based on an actual situation.

Similarly, if the second interference parameter is greater than the interference parameter threshold, the second device may determine that the first multi-link device does not support the second operation, that is, the first multi-link device does not support sending the PPDU on the second link concurrently with receiving the PPDU on the first link. If the second interference parameter is less than the interference parameter threshold, the second device may determine that the first multi-link device supports the second operation, that is, the first multi-link device supports sending the PPDU on the second link concurrently with receiving the PPDU on the first link. If the second interference parameter is equal to the interference parameter threshold, the second device may determine that the first multi-link device supports the second operation, or may determine that the first multi-link device does not support the second operation. In actual application, when the second interference parameter is equal to the interference parameter threshold, whether the first multi-link device supports the second operation may be set based on an actual situation.

It may be understood that, by comparing the first interference parameter with the interference parameter threshold, an STR capability in a direction from the first link to the second link may be determined, or whether transmission of a PPDU on the first link interferes with concurrent reception of a PPDU on the second link may be determined. By comparing the second interference parameter with the interference parameter threshold, an STR capability in a direction from the second link to the first link may be determined, or whether transmission of a PPDU on the second link interferes with concurrent reception of a PPDU on the first link may be determined.

The interference parameter threshold may include one threshold, or may include two thresholds. If the interference parameter threshold includes one threshold, the first interference parameter and the second interference parameter are separately compared with the interference parameter threshold. If the interference parameter threshold includes two thresholds, for example, a first interference parameter threshold and a second interference parameter threshold, the first interference parameter may be compared with the corresponding first interference parameter threshold, and the second interference parameter may be compared with the corresponding second interference parameter threshold. For STR capabilities corresponding to different comparison results, refer to the foregoing descriptions. Details are not described herein again.

It may be understood that in this embodiment of this application, the interference parameter information carries a bidirectional interference parameter (that is, the first interference parameter and the second interference parameter). The carried information is more abundant, and a subsequent operation may be performed based on interference in different directions, so that a subsequent communication procedure is more flexible. Certainly, this embodiment of this application may be used in a case of inter-link interference asymmetry, or may be used in a case of inter-link interference symmetry. For the case of inter-link interference asymmetry, interference parameters in two operations are carried in this embodiment of this application. This helps a receive end accurately determine STR capabilities in different operations.

Optionally, the interference parameter information may include a maximum interference parameter, and the maximum interference parameter may be a maximum value of the first interference parameter and the second interference parameter. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first operation may be that the first multi-link device transmits a PPDU on the first link concurrently with receiving a PPDU on the second link. The second operation may be that the first multi-link device transmits a PPDU on the second link concurrently with receiving a PPDU on the first link. The first interference parameter may also be described as a cross-link interference parameter of the first link to the second link. The second interference parameter may be described as a cross-link interference parameter of the second link to the first link. The maximum interference parameter may also be described as a cross-link interference parameter of a link pair (including the first link and the second link). The cross-link interference parameter of the link pair is a maximum value of cross-link interference parameters of the first link to the second link and of the second link to the first link.

After receiving the first indication information, the second device may obtain a maximum interference parameter indicated by the first indication information. The second device may obtain the interference parameter threshold, and may compare the maximum interference parameter with the interference parameter threshold. If the maximum interference parameter is greater than the interference parameter threshold, the second device may determine that the first multi-link device does not support the simultaneous transmit and receive operation on the first link and the second link (or the link pair). If the maximum interference parameter is less than the interference parameter threshold, the second device may determine that the first multi-link device supports the simultaneous transmit and receive operation on the first link and the second link (or the link pair). If the maximum interference parameter is equal to the interference parameter threshold, the second device may determine that the first multi-link device does not support the simultaneous transmit and receive operation on the first link and the second link (or the link pair), or may determine that the first multi-link device supports the simultaneous transmit and receive operation on the first link and the second link (or the link pair). In actual application, when the maximum interference parameter is equal to the interference parameter threshold, whether the first multi-link device supports the simultaneous transmit and receive operation on the first link and the second link (or the link pair) may be set based on an actual situation.

It may be understood that, by comparing the maximum interference parameter with the interference parameter threshold, an STR capability of a link pair may be determined, or whether transmission of a PPDU on one link of a link pair interferes with concurrent reception of a PPDU on the other link of the link pair may be determined.

It may be understood that there are two methods for obtaining the interference parameter threshold by the second device. In one method, the second device locally obtains the interference parameter threshold corresponding to the first multi-link device. In the other method, the first multi-link device sends the interference parameter threshold, and correspondingly the second device receives the interference parameter threshold from the first multi-link device.

It may be understood that in this embodiment of this application, the cross-link interference parameter (that is, the maximum interference parameter) of the link pair is carried in the interference parameter information, so that signaling overheads can be reduced, and a unified procedure can be designed during subsequent bidirectional communication.

2. The first indication information indicates whether the simultaneous transmit and receive operation is supported on the first link and the second link.

If sending a PPDU on the first link by the first multi-link device interferes with receiving a PPDU on the second link, and an error occurs during reception of the PPDU on the second link, the first multi-link device does not support transmission on the first link concurrent with reception on the second link, or the first multi-link device does not support the first operation in a direction from the first link to the second link. If sending a PPDU on the second link by the first multi-link device interferes with receiving a PPDU on the first link, and an error occurs during reception of the PPDU on the first link, the first multi-link device does not support transmission on the second link concurrent with reception on the first link, or the first multi-link device does not support the second operation in a direction from the second link to the first link. If the first multi-link device does not support the simultaneous transmit and receive operation in at least one of directions from the first link to the second link and from the second link to the first link, it is determined that the first multi-link device does not support the simultaneous transmit and receive operation on the first link and the second link. That is, the first multi-link device neither supports sending a PPDU on the first link concurrently with receiving a PPDU on the second link, nor supports sending a PPDU on the second link concurrently with receiving a PPDU on the first link. Therefore, the first indication information indicates that the simultaneous transmit and receive operation is not supported on the first link and the second link.

If sending a PPDU on the first link by the first multi-link device does not interfere with concurrently receiving a PPDU on the second link, and sending a PPDU on the second link does not interfere with concurrently receiving a PPDU on the first link, it is considered that the first multi-link device supports the simultaneous transmit and receive operation on the first link and the second link. That is, the first multi-link device supports sending a PPDU on the first link concurrently with receiving a PPDU on the second link, and also supports sending a PPDU on the second link concurrently with receiving a PPDU on the first link. Therefore, the first indication information indicates that the simultaneous transmit and receive operation is supported on the first link and the second link. After receiving the first indication information, the second device may determine whether the first multi-link device supports the simultaneous transmit and receive operation on the first link and the second link.

Optionally, the first indication information may be 1-bit information. When the 1-bit information is set to 1, it may indicate that the simultaneous transmit and receive operation is supported on the first link and the second link. When the 1-bit information is set to 0, it may indicate that the simultaneous transmit and receive operation is not supported on the first link and the second link.

It may be understood that most communication is bidirectional. Therefore, if a link pair is non-STR in one direction, an entire communication process is affected. Therefore, when a link pair is non-STR in any direction in this embodiment of this application, the two links are non-STR. This helps design a unified procedure for subsequent bidirectional communication. In this embodiment of this application, the STR capability of the link pair is further indicated by using the first indication information, so that signaling overheads can be reduced.

Optionally, the method further includes: The second device communicates with the first multi-link device based on the determined STR capability.

Specifically, if it is determined that the first multi-link device supports the simultaneous transmit and receive operation on the first link and the second link, the second device may communicate with the first multi-link device on the first link and the second link in a simultaneous transmit and receive manner. Specifically, when the first multi-link device may send a PPDU on the first link, the second device sends a PPDU to the first multi-link device on the second link. In other words, the first multi-link device and the second device perform uplink communication through the first link concurrently with performing downlink communication through the second link. That is, the first link and the second link are used independently for communication. Alternatively, it may be understood that when the first multi-link device sends a PPDU on the second link, the second device sends a PPDU to the first multi-link device on the first link. In other words, the first multi-link device and the second device perform uplink communication through the first link, and perform downlink communication through the second link.

If it is determined that the first multi-link device does not support the simultaneous transmit and receive operation on the first link and the second link, in a communication process between the first multi-link device and the second device, PPDUs on the first link and the second link need to be aligned. That is, an end moment of PPDU 1 on the first link in a transmission direction is aligned with an end moment of PPDU 2 sent on the second link in the same transmission direction. Specifically, the first multi-link device and the second device concurrently transmit uplink data or downlink data on the first link and the second link. For example, the first multi-link device simultaneously or concurrently sends PPDUs on the first link and the second link. Alternatively, the second device simultaneously or concurrently sends PPDUs to the first multi-link device on the first link and the second link. The end moment of PPDU 1 on the first link is the same as the end moment of PPDU 2 on the second link.

In this embodiment of this application, the first indication information carries the bidirectional interference parameter or the interference parameter of the link pair, or the first indication information indicates whether the simultaneous transmit and receive operation is supported on two links, so that the STR capability of the first multi-link device on the two links is determined. In the case of inter-link interference asymmetry, bidirectional interference may be fed back to a peer end, or a result of comprehensive bidirectional interference is fed back to the peer end, so that an STR capability indication method in the case of inter-link interference asymmetry is provided.

In an optional embodiment, in this embodiment of this application, an STR capability on a link pair is determined based on an indicated interference parameter on the link pair. Specifically, the first multi-link device sends the interference parameter between the first link and the second link, and correspondingly the second device receives the interference parameter from the first multi-link device. The second device determines, based on the interference parameter, whether the first multi-link device supports the simultaneous transmit and receive operation on the first link and the second link.

The interference parameter may be a cross-link interference parameter between the first link and the second link. After receiving the interference parameter, the second device may obtain the interference parameter threshold, and may compare the interference parameter with the interference parameter threshold, to determine whether the simultaneous transmit and receive operation is supported on the first link and the second link. If the interference parameter is greater than the interference parameter threshold, the second device may determine that the first multi-link device does not support the simultaneous transmit and receive operation on the first link and the second link (or the link pair). If the interference parameter is less than the interference parameter threshold, the second device may determine that the first multi-link device supports the simultaneous transmit and receive operation on the first link and the second link (or the link pair). If the interference parameter is equal to the interference parameter threshold, the second device may determine that the first multi-link device does not support the simultaneous transmit and receive operation on the first link and the second link (or the link pair), or may determine that the first multi-link device supports the simultaneous transmit and receive operation on the first link and the second link (or the link pair). In actual application, when the interference parameter is equal to the interference parameter threshold, whether the first multi-link device supports the simultaneous transmit and receive operation on the first link and the second link (or the link pair) may be set based on an actual situation.

It may be understood that there are two methods for obtaining the interference parameter threshold by the second device. In one method, the second device locally obtains the interference parameter threshold corresponding to the first multi-link device. In the other method, the first multi-link device sends the interference parameter threshold, and correspondingly the second device receives the interference parameter threshold from the first multi-link device.

Optionally, the interference parameter may be carried in a cross-link interference subfield. Values of the cross-link interference subfield represent different cross-link interference value intervals, as shown in Table 1 below. It may be understood that Table 1 is merely an example, a meaning in Table 1 may have another value or interval, and there may be another correspondence between a value and a meaning in Table 1.

TABLE 1

Value and meaning of the cross-link interference subfield

| Value of the cross-link interference subfield | Meaning (meaning) |
|---|---|
| 0 | <−82 dBm |
| 1 | [−82, −79) dBm |
| 2 | [−79, −76) dBm |
| 3 | [−76, −73) dBm |
| . . . | |
| 14 | [−43, −40) dBm |
| 15 | ≥−40 dBm |

Optionally, in addition to the interference parameter, the first multi-link device may further send an STR indication. The STR indication indicates whether the simultaneous transmit and receive operation is supported on the first link and the second link. It may be understood that the simultaneous transmit and receive operation in this embodiment of this application may mean transmission on one link concurrent with reception on another link.

It may be understood that in this embodiment of this application, an STR capability on a link pair is determined based on an indicated interference parameter of the link pair, so that whether a multi-link device supports a simultaneous transmit and receive operation on the link pair (that is, two links) may be indicated, thereby laying a communication foundation for subsequent data communication.

Embodiment 2

According to the STR capability indication method provided in the embodiments of this application, STR capability information may be determined with reference to different bandwidth combinations on two links, and whether the simultaneous transmit and receive operation is supported is determined based on the STR capability information.

Figure 7:
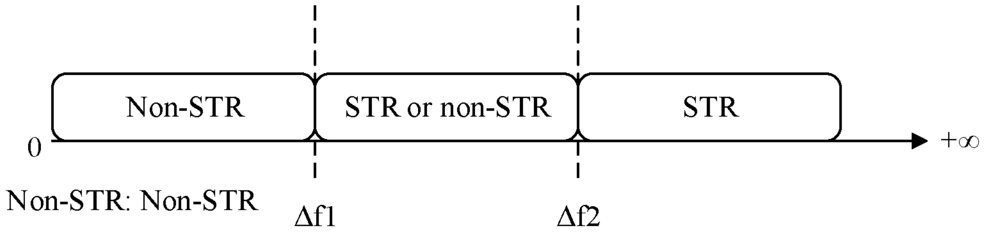
FIG. 7 is a schematic diagram of a frequency spacing between two links according to an embodiment of this application.

Understandably, as described above, there are many factors that affect an STR capability. In Embodiment 2 of this application, the STR capability indication method provided in the embodiments of this application is mainly described with reference to a bandwidth. FIG. 7 is a schematic diagram of a frequency spacing between two links according to an embodiment of this application. As shown in FIG. 7, it is assumed that two links are in a non-STR state within a frequency spacing from 0 to Δf1, and are in an STR state from Δf2 to infinity. When the frequency spacing between the two links is very small, for example, less than Δf1, energy/interference leaked to link 2 in a process of sending PPDU 1 on link 1 is very strong, and exceeds −62 dBm. In this case, a clear channel assessment (CCA) energy detection result of link 2 is busy. As a result, link 2 cannot be used for channel access, and a channel cannot be contended for to send data. In this case, assuming that PPDU 2 is sent in the most robust sending manner on link 2, PPDU 2 cannot be correctly received at a receive end. When the frequency spacing between the two links is very large, for example, greater than Δf2, energy/interference leaked to link 2 in a process of sending PPDU 1 on link 1 is so weak (less than ~62 dBm) that the CCA is not affected and reception of PPDU 2 on link 2 at any parameter setting is not affected.

However, there is a transition frequency spacing interval between Δf1 and Δf2, and whether the simultaneous transmit and receive operation is supported on the two links in this transition frequency spacing interval is related to a bandwidth used on the two links. That is, when a bandwidth (for example, 20 MHz) is used, the two links are non-STR; when another bandwidth (for example, 160 MHz) is used, the two links are STR; when still another bandwidth is used, the two links may be STR or non-STR. Similarly, a similar conclusion may be obtained from perspectives of different transmit power, different PPDU bandwidths, different MCSs, and the like. Details are not described in this embodiment of this application. In Embodiment 2 of this application, the STR capability indication method provided in the embodiments of this application is mainly described with reference to bandwidths used on two links.

A bandwidth directly affects a frequency spacing between two links. Generally, a larger transmit bandwidth of a PPDU indicates a smaller frequency spacing between links. However, when a large bandwidth is used to send a PPDU, out-of-band interference attenuation is slow, which further aggravates cross-link interference. Therefore, the bandwidth is one of the major factors that affect the STR capability. In addition, almost all PPDUs carry bandwidth information when being sent. Therefore, the bandwidth of the PPDU is easy to obtain, and then an STR capability is determined based on the bandwidth of the PPDU.

Figure 8:
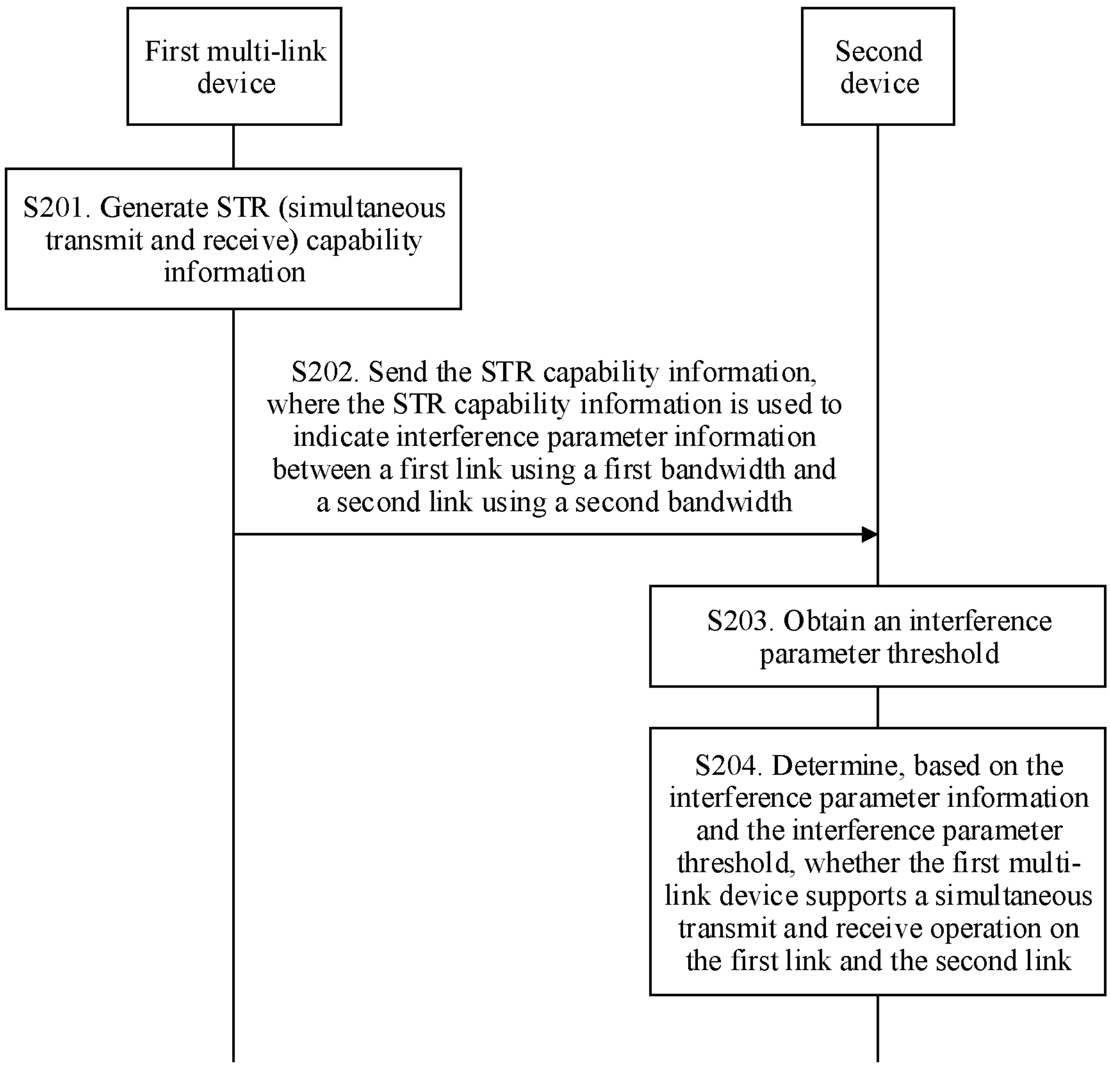
FIG. 8 is a second schematic flowchart of an STR capability indication method according to an embodiment of this application.

FIG. 8 is a second schematic flowchart of an STR capability indication method according to an embodiment of this application. As shown in FIG. 8, the STR capability indication method includes but is not limited to the following steps.

S201. A first multi-link device generates STR capability information.

S202. The first multi-link device sends the STR capability information, where the STR capability information indicates interference parameter information between a first link using a first bandwidth and a second link using a second bandwidth. Correspondingly, a second device receives the STR capability information from the first multi-link device.

Specifically, the first bandwidth and the second bandwidth include but are not limited to the following five implementations.

Implementation 1: The first bandwidth may include but is not limited to any one of the following: 20 MHz, 40 MHz, 80 MHz, 160 MHz, or 320 MHz. The second bandwidth may also include but is not limited to any one of the following: 20 MHz, 40 MHz, 80 MHz, 160 MHz, or 320 MHz. It may be understood that if the first bandwidth and the second bandwidth are any one of the foregoing five bandwidths, there are a plurality of bandwidth combinations of the first bandwidth and the second bandwidth. According to a permutation and combination manner, there are a total of 5×5=25 bandwidth combinations.

For example, as shown in Table 2 below, the 25 bandwidth combinations of the first bandwidth and the second bandwidth are: (20, 20), (20, 40), (20, 80), (20, 160), (20, 320), (40, 20), (40, 40), (40, 80), (40, 160), (40, 320), (80, 20), (80, 40), (80, 80), (80, 160), (80, 320), (160, 20), (160, 40), (160, 80), (160, 160), (160, 320), (320, 20), (320, 40), (320, 80), (320, 160), and (320, 320). The first column in Table 2 may represent the first bandwidth, and the first row may represent the second bandwidth. Alternatively, it may be understood that the first column in Table 2 may represent the second bandwidth, and the first row may represent the first bandwidth.

TABLE 2

| Bandwidth combination 1 of the first bandwidth and the second bandwidth | | | | | |
|---|---|---|---|---|---|
| | 20 MHz | 40 MHz | 80 MHz | 160 MHz | 320 MHz |
| 20 MHz | (20, 20) | (20, 40) | (20, 80) | (20, 160) | (20, 320) |
| 40 MHz | (40, 20) | (40, 40) | (40, 80) | (40, 160) | (40, 320) |
| 80 MHz | (80, 20) | (80, 40) | (80, 80) | (80, 160) | (80, 320) |
| 160 MHz | (160, 20) | (160, 40) | (160, 80) | (160, 160) | (160, 320) |
| 320 MHz | (320, 20) | (320, 40) | (320, 80) | (320, 160) | (320, 320) |

Optionally, the first bandwidth may alternatively be 60 MHz, 120 MHz, 240 MHz, or another bandwidth in a puncturing mode. Similarly, the second bandwidth may also be 60 MHz, 120 MHz, 240 MHz, or another bandwidth in the puncturing mode.

For ease of description, in Implementation 1, the first bandwidth is denoted as a link1 bandwidth, the second bandwidth is denoted as a link2 bandwidth, and a bandwidth combination of the first bandwidth and the second bandwidth is denoted as [link1 bandwidth, link2 bandwidth].

Implementation 2: The first bandwidth may be a maximum bandwidth supported by the first link, a maximum bandwidth of a BSS to which a station working on the first link belongs, or a maximum bandwidth that is available for sending a PPDU and that is of a BSS to which a station working on the first link belongs. The second bandwidth may include but is not limited to any one of the following: 20 MHz, 40 MHz, 80 MHz, 160 MHz, or 320 MHz. Alternatively, the first bandwidth may include but is not limited to any one of the following: 20 MHz, 40 MHz, 80 MHz, 160 MHz, or 320 MHz. The second bandwidth may be a maximum bandwidth supported by the second link, a maximum bandwidth of a BSS to which a station working on the second link belongs, or a maximum bandwidth that is available for sending a PPDU and that is of a BSS to which a station working on the second link belongs. It may be understood that if the first bandwidth and the second bandwidth are any one of the foregoing combinations, there are a total of 1×5+5×1=10 bandwidth combinations of the first bandwidth and the second bandwidth. A bandwidth of a BSS may be a bandwidth in which an AP of the BSS can perform reception.

For example, it is assumed that the maximum bandwidth supported by the first link is 160 MHz, and the maximum bandwidth supported by the second link is 80 MHz. Bandwidth combinations of the first bandwidth and the second bandwidth include (160, 20), (160, 40), (160, 80), (20, 80), (40, 80), and (80, 80).

Optionally, when the first bandwidth is the maximum bandwidth supported by the first link, the second bandwidth may alternatively be 60 MHz, 120 MHz, 240 MHz, or another bandwidth in the puncturing mode. Similarly, when the second bandwidth is the maximum bandwidth supported by the second link, the first bandwidth may also be 60 MHz, 120 MHz, 240 MHz, or another bandwidth in the puncturing mode.

It may be understood that, because bandwidth capabilities supported by an AP MLD and a non-AP MLD may be inconsistent, the maximum bandwidth supported by the first link may be a maximum bandwidth supported by the AP MLD on the first link, and the maximum bandwidth supported by the second link may be a maximum bandwidth supported by the AP MLD on the second link. In this case, the first multi-link device may be an AP MLD, and the second device may be a non-AP MLD.

For ease of description, in Implementation 2, if the maximum bandwidth supported by the first link is denoted as a link1 BSS bandwidth, and the maximum bandwidth supported by the second link is denoted as a link2 BSS bandwidth, a bandwidth combination of the first bandwidth and the second bandwidth is denoted as [link1 BSS bandwidth, link2 bandwidth] and [link1 bandwidth, link2 BSS bandwidth].

Implementation 3: The first bandwidth is an operating bandwidth on the first link, and the second bandwidth includes but is not limited to any one of 20 MHz, 40 MHz, 80 MHz, 160 MHz, or 320 MHz. Alternatively, the first bandwidth includes but is not limited to any one of 20 MHz, 40 MHz, 80 MHz, 160 MHz, or 320 MHz, and the second bandwidth is an operating bandwidth on the second link. It may be understood that if the first bandwidth and the second bandwidth are any one of the foregoing five bandwidths, there are a total of 1×5+5×1=10 bandwidth combinations of the first bandwidth and the second bandwidth. For example, if the operating bandwidth on the first link is 80 MHz, bandwidth combinations of the first bandwidth and the second bandwidth include (80, 20), (80, 40), (80, 80), (80, 160), and (80, 320); if the operating bandwidth on the second link is 20 MHz, bandwidth combinations of the first bandwidth and the second bandwidth include (20, 20), (40, 20), (80, 20), (160, 20), and (320, 20).

Optionally, when the first bandwidth is the operating bandwidth on the first link, the second bandwidth may alternatively be 60 MHz, 120 MHz, 240 MHz, or another bandwidth in the puncturing mode. Similarly, when the second bandwidth is the operating bandwidth on the second link, the first bandwidth may also be 60 MHz, 120 MHz, 240 MHz, or another bandwidth in the puncturing mode.

It may be understood that the operating bandwidth is described from a station side. The operating bandwidth on the first link is also an operating bandwidth of a non-AP MLD on the first link. The operating bandwidth on the second link is also an operating bandwidth of a non-AP MLD on the second link. It may be further understood that, in this case, the first multi-link device may be a non-AP MLD, and the second device may be an AP MLD. The operating (channel) bandwidth may be a channel bandwidth in which a station is currently able to perform reception (operating channel width: The channel width in which the station (STA) is currently able to perform reception).

For ease of description, in Implementation 3, if the operating bandwidth on the first link is denoted as a link1 operating bandwidth, and the operating bandwidth on the second link is denoted as a link2 operating bandwidth, a bandwidth combination of the first bandwidth and the second bandwidth is denoted as [link1 operating bandwidth, link2 bandwidth] and [link1 bandwidth, link2 operating bandwidth].

Implementation 4: The first bandwidth is an operating bandwidth of a non-AP MLD on the first link, and the second bandwidth is an operating bandwidth of the non-AP MLD on the second link. It may be understood that, according to the permutation and combination manner, there is only one bandwidth combination of the first bandwidth and the second bandwidth. For example, if the operating bandwidth on the first link is 80 MHz, and the operating bandwidth on the second link is 20 MHz, a bandwidth combination of the first bandwidth and the second bandwidth is (80, 20). Units of the bandwidth combination are all MHz.

For ease of description, in Implementation 4, if the operating bandwidth on the first link is denoted as a link1 operating bandwidth, and the operating bandwidth on the second link is denoted as a link2 operating bandwidth, a bandwidth combination of the first bandwidth and the second bandwidth is denoted as [link1 operating bandwidth, link2 operating bandwidth].

Implementation 5: The first bandwidth may be a maximum bandwidth supported by the first link, a maximum bandwidth of a BSS to which a station working on the first link belongs, or a maximum bandwidth that is available for sending a PPDU and that is of a BSS to which a station working on the first link belongs. The second bandwidth may be a maximum bandwidth supported by the second link, a maximum bandwidth of a BSS to which a station working on the second link belongs, or a maximum bandwidth that is available for sending a PPDU and that is of a BSS to which a station working on the second link belongs. It may be understood that, according to the permutation and combination manner, there is only one bandwidth combination of the first bandwidth and the second bandwidth. For example, if the maximum bandwidth supported by the first link is 160 MHz, and the maximum bandwidth supported by the second link is 20 MHz, a bandwidth combination of the first bandwidth and the second bandwidth is (160, 20). Units of the bandwidth combination are all MHz.

The foregoing content describes five different types of bandwidth combinations. The following describes the STR capability information with reference to the foregoing five different types of bandwidth combinations.

Specifically, the simultaneous transmit and receive operation may include a first operation and a second operation. The first operation may be that the first multi-link device transmits a first PPDU on the first link concurrently with receiving a second PPDU on the second link. The second operation may be that the first multi-link device transmits a second PPDU on the second link concurrently with receiving a first PPDU on the first link. A bandwidth of the first PPDU may be equal to the first bandwidth, and a bandwidth of the second PPDU may be equal to the second bandwidth. A bandwidth of a PPDU may be a bandwidth used for sending the current PPDU.

The foregoing STR capability information has two implementations. Implementation 1 of the STR capability information is applicable to any one of Implementation 1 to Implementation 5 of the first bandwidth and the second bandwidth. Implementation 2 of the STR capability information is applicable to any one of Implementation 1 to Implementation 3 of the first bandwidth and the second bandwidth.

(1a) Implementation 1 of the STR Capability Information

The STR capability information may be used to indicate the interference parameter information in a bandwidth combination. The interference parameter information may include one interference parameter, or may include two interference parameters. In other words, one bandwidth combination may correspond to one interference parameter, or may correspond to two interference parameters. When the interference parameter information includes one interference parameter, the interference parameter information may include a target interference parameter, and the target interference parameter is a maximum value of a first interference parameter and a second interference parameter in a same bandwidth combination. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a first-link-to-second-link (link 1 to link 2/link 1→link 2) cross-link interference parameter. The second interference parameter may be described as a second-link-to-first-link (link 2 to link 1/link 2→link 1) cross-link interference parameter.

For example, it is assumed that the bandwidth combination is (80 MHz, 20 MHz), that is, the first bandwidth is equal to 80 MHz, and the second bandwidth is equal to 20 MHz; it is assumed that the first interference parameter is A dBm, the second interference parameter is B dBm, and A is greater than B. In this case, the STR capability information indicates the interference parameter information in the bandwidth combination (80 MHz, 20 MHz), and the target interference parameter is a maximum value of the first interference parameter and the second interference parameter in the bandwidth combination (80 MHz, 20 MHz), that is, A dBm.

Figure 9A:
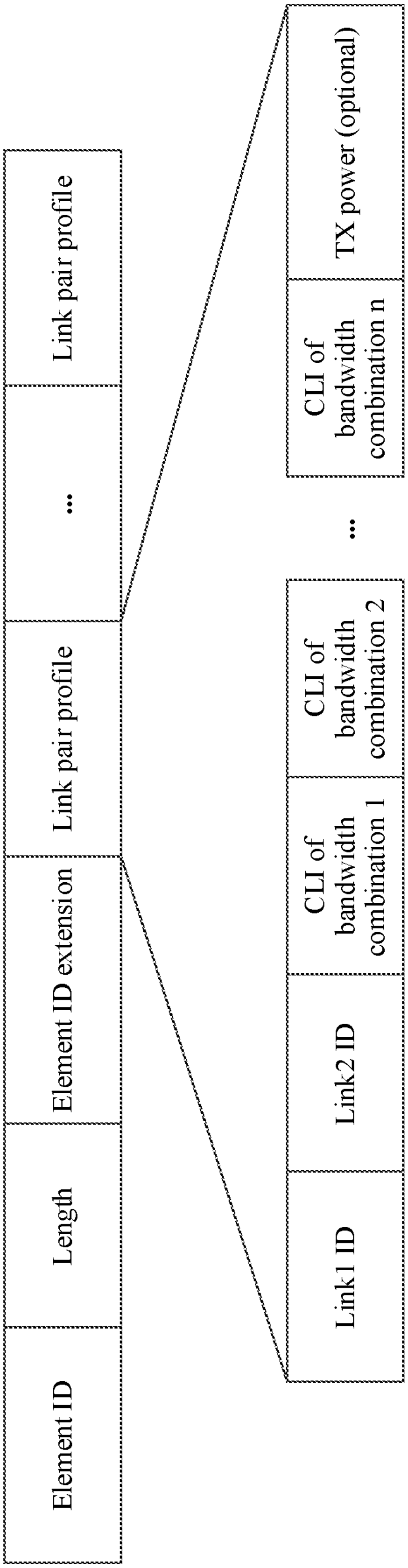
FIG. 9*a* is a schematic diagram of a first frame structure of a new element field according to an embodiment of this application.

Optionally, the STR capability information may be carried in a new element field. FIG. 9*a* is a schematic diagram of a first frame structure of a new element field according to an embodiment of this application. As shown in FIG. 9*a*, the new element field may include an element identifier field, a length field, an element identifier extension field, and at least one link pair profile field. Each link pair profile field includes interference-related information of one link pair in at least one bandwidth combination, for example, two link identifier subfields and at least one cross-link interference indication field. Each cross-link interference indication field indicates an interference parameter (that is, the target interference parameter) in a bandwidth combination. Optionally, each link pair profile field may further include a transmit power subfield.

When the interference parameter information includes two interference parameters, the interference parameter information may include a first interference parameter and a second interference parameter in a same bandwidth combination. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a first-link-to-second-link (link 1 to link 2/link 1→link 2) cross-link interference parameter. The second interference parameter may be described as a second-link-to-first-link (link 2 to link 1/link 2→link 1) cross-link interference parameter.

For example, it is assumed that the bandwidth combination is (80 MHz, 20 MHz), that is, the first bandwidth is equal to 80 MHz, and the second bandwidth is equal to 20 MHz; it is assumed that the first interference parameter is A dBm, and the second interference parameter is B dBm. In this case, the STR capability information indicates the interference parameter information in the bandwidth combination (80 MHz, 20 MHz), and the interference parameter information includes the first interference parameter, that is, A dBm, and the second interference parameter, that is, B dBm, in the bandwidth combination (80 MHz, 20 MHz).

Optionally, the STR capability information may further include information about a bandwidth combination, that is, the first bandwidth and the second bandwidth.

It may be understood that the bandwidth combination may be any bandwidth combination of the first bandwidth and the second bandwidth in Implementation 1 to Implementation 5.

Optionally, if there are N (N herein is an integer greater than or equal to 1) bandwidth combinations of the first bandwidth and the second bandwidth, there are N pieces of STR capability information. The N pieces of STR capability information may be carried in one radio frame, or may be carried in a plurality of radio frames. This is not limited in this embodiment of this application. Specifically, if the first multi-link device is a non-AP MLD, the STR capability information may be carried in a probe request frame or an association request frame. If the first multi-link device is an AP MLD, the STR capability information may be carried in a beacon frame, a probe response frame, or an association response frame. The interference parameter information may be carried in an EHT operation element or an EHT capability element of a radio frame.

(1b) Implementation 2 of the STR Capability Information

The STR capability information may be used to indicate interference parameter information of a link pair. The interference parameter information may include one or two maximum interference parameters. This is because one bandwidth combination may correspond to one or two interference parameters.

When the interference parameter information includes one maximum interference parameter, the maximum interference parameter is a maximum value of at least one interference parameter corresponding to at least one bandwidth combination. It may be understood that the maximum interference parameter may be expressed in a mathematical form as: max{interference parameter (bandwidth combination)}.

Figure 9B:
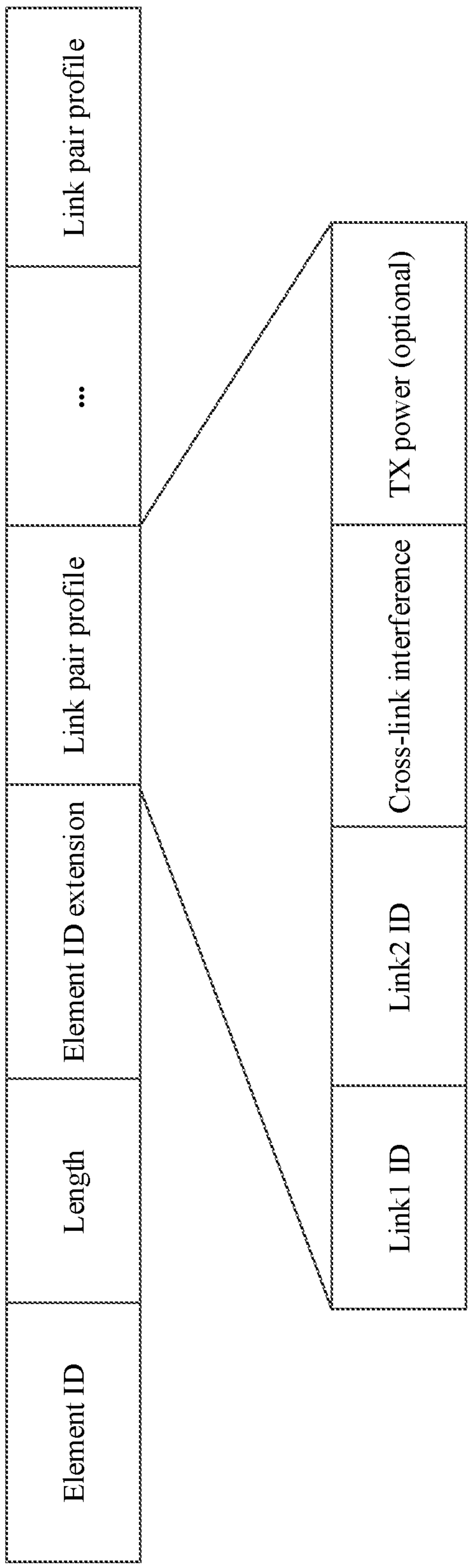
FIG. 9*b* is a schematic diagram of a second frame structure of a new element field according to an embodiment of this application.

Optionally, the STR capability information may be carried in a new element field. FIG. 9*b* is a schematic diagram of a second frame structure of a new element field according to an embodiment of this application. As shown in FIG. 9*b*, the new element field may include an element identifier field, a length field, an element identifier extension field, and at least one link pair profile field. Each link pair profile field includes interference-related information of one link pair, for example, two link identifier subfields and one cross-link interference indication field, and optionally includes one transmit power field. The cross-link interference indication field is used to carry interference parameter information/a maximum interference parameter.

When the interference parameter information includes two maximum interference parameters, for example, maximum interference parameter i and maximum interference parameter j, maximum interference parameter i is a maximum value of at least one first interference parameter corresponding to at least one bandwidth combination, and maximum interference parameter j is a maximum value of at least one second interference parameter corresponding to the at least one bandwidth combination. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a first-link-to-second-link (link 1 to link 2/link 1→link 2) cross-link interference parameter. The second interference parameter may be described as a second-link-to-first-link (link 2 to link 1/link 2→link 1) cross-link interference parameter. It may be understood that maximum interference parameter i may be expressed in a mathematical form as: max{link 1 to link 2/link 1→link 2 interference parameter (bandwidth combination)}; maximum interference parameter j may be expressed in a mathematical form as: max {link 2 to link 1/link 2→link 1 interference parameter (bandwidth combination)}.

Figure 9C:
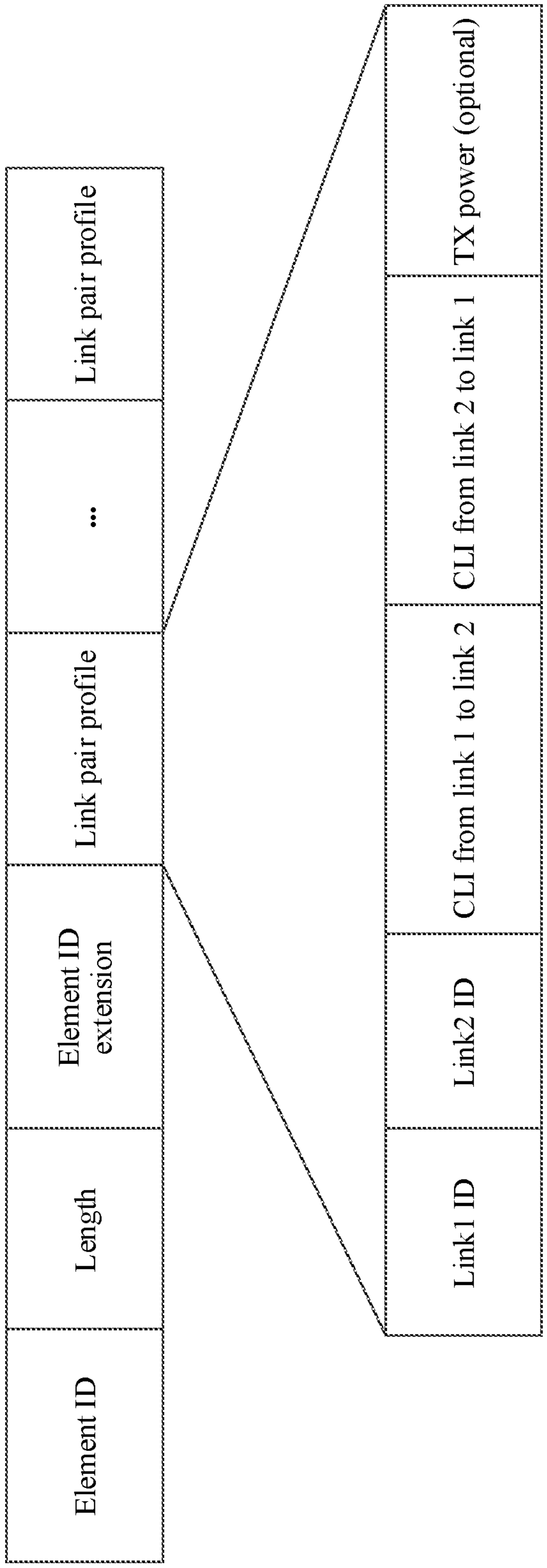
FIG. 9*c* is a schematic diagram of a third frame structure of a new element field according to an embodiment of this application.

Optionally, FIG. 9*c* is a schematic diagram of a third frame structure of a new element field according to an embodiment of this application. As shown in FIG. 9*c*, the new element field is used to carry the STR capability information, and may include an element identifier field, a length field, an element identifier extension field, and at least one link pair profile field. Each link pair profile field includes interference-related information of one link pair in different directions, for example, two link identifier subfields and two cross-link interference indication fields. The two cross-link interference indication fields respectively correspond to interference (that is, maximum interference parameter i) of transmission on link 1 to reception on link 2 and interference (that is, maximum interference parameter j) of transmission on link 2 to reception on link 1.

The at least one bandwidth combination may be all bandwidth combinations of the first bandwidth and the second bandwidth in any one of Implementation 1 to Implementation 3.

It may be understood that in this embodiment of this application, the interference parameter information carries the maximum interference parameter, and when an operating channel changes, the interference parameter does not need to be updated.

Optionally, even if there are N (N herein is an integer greater than 1) bandwidth combinations of the first bandwidth and the second bandwidth, there is only one piece of STR capability information, and the STR capability information may be carried in one radio frame. Specifically, if the first multi-link device is a non-AP MLD, the STR capability information may be carried in a probe request frame or an association request frame. If the first multi-link device is an AP MLD, the STR capability information may be carried in a beacon frame, a probe response frame, or an association response frame. Alternatively, the interference parameter information may be carried in an EHT operation element of the radio frame.

It should be noted that, in an implementation, the first multi-link device may report one or more of the bandwidth combinations in Implementation 1, for example, report the interference parameter information of the 25 bandwidth combinations or some of the 25 bandwidth combinations. In this method, the reporting precision is high, and the first multi-link device may report interference parameters in various bandwidth combinations as required, so that the second device can accurately obtain STR capabilities of the first multi-link device in various bandwidth combinations. In another implementation, the first multi-link device may report the interference parameters of the bandwidth combinations in Implementation 2 or report the interference parameters of the bandwidth combinations in Implementation 3. The two manners are well compromised between signaling overheads and the reporting precision. If the first multi-link device reports the bandwidth combinations in Implementation 4 and Implementation 5, signaling overheads are minimum.

In the two implementations of the STR capability information, the cross-link interference parameter may be carried in the STR capability information in a form of an index, or may be carried in the STR capability information in a form of an absolute value. If the cross-link interference parameter is carried in the STR capability information in a form of an index, communication parties need to specify a correspondence between an index and a meaning of the cross-link interference parameter by using a protocol.

The following provides several possible representations of the cross-link interference parameter. Representation 1: An index of the cross-link interference parameter corresponds to an absolute value of the cross-link interference parameter, as shown in Table 3 and Table 4 below. Representation 2: An index of the cross-link interference parameter corresponds to an absolute value interval of the cross-link interference parameter, as shown in Table 5 and Table 6 below.

TABLE 3

Correspondence 1 between an index of the cross-link interference parameter and an absolute value of the cross-link interference parameter

| Index of the cross-link interference parameter/ Value of a cross-link interference subfield | Meaning (meaning) |
|---|---|
| 0 | ≤X0 dBm |
| 1 | X1 dBm |
| 2 | X2 dBm |
| 3 | X3 dBm |
| . . . | |
| n − 1 | . . . |
| n | ≥Xn dBm |

TABLE 4

| Correspondence 2 between an index of the cross-link interference parameter and an absolute value of the cross-link interference parameter | |
|---|---|
| Index of the cross-link interference parameter/ Value of a cross-link interference subfield | Meaning (meaning) |
| 0 | STR |
| 1 | X1 dBm |
| 2 | X2 dBm |
| 3 | X3 dBm |
| . . . | |
| n − 1 | . . . |
| n | Non-STR |

TABLE 5

| Correspondence 1 between an index of the cross-link interference parameter and an absolute value interval of the cross-link interference parameter | |
|---|---|
| Index of the cross-link interference parameter/ Value of a cross-link interference subfield | Meaning (meaning) |
| 0 | (0, X1) dBm |
| 1 | [X1, X2) dBm |
| 2 | [X2, X3) dBm |
| 3 | [X4, X5) dBm |
| . . . | |
| n − 1 | . . . |
| n | [Xn, +∞) dBm |

TABLE 6

| Correspondence 2 between an index of the cross-link interference parameter and an absolute value interval of the cross-link interference parameter | |
|---|---|
| Index of the cross-link interference parameter/ Value of a cross-link interference subfield | Meaning (meaning) |
| 0 | STR |
| 1 | [X1, X2) dBm |
| 2 | [X2, X3) dBm |
| 3 | [X4, X5) dBm |
| . . . | |
| n − 1 | . . . |
| n | Non-STR |

X0, X1, X2, X3, . . . , and Xn in Table 3 to Table 6 respectively represent absolute value. X0, X1, X2, X3, . . . , and Xn may have an equal difference, or may have a segmental equal difference. 0, 1, 2, 3, . . . , n−1, and n indicate index values or values.

S203. The second device obtains an interference parameter threshold.

S204. The second device determines, based on the interference parameter information and the interference parameter threshold, whether the first multi-link device supports the simultaneous transmit and receive operation on the first link and the second link.

In some feasible implementations, for (1a) Implementation 1 of the STR capability information, after receiving the STR capability information, the second device may obtain the interference parameter information indicated by the STR capability information. The second device obtains the interference parameter threshold, and may compare the interference parameter threshold with the interference parameter included in the interference parameter information.

When the interference parameter information includes a target interference parameter, if the target interference parameter is greater than the interference parameter threshold, the second device may determine that the first multi-link device does not support performing the first operation and the second operation in a combined bandwidth of the first bandwidth and the second bandwidth, that is, does not support the simultaneous transmit and receive operation on the first link using the first bandwidth and the second link using the second bandwidth. If the target interference parameter is less than the interference parameter threshold, the second device may determine that the first multi-link device supports performing the first operation and the second operation in a combined bandwidth of the first bandwidth and the second bandwidth, that is, supports performing the simultaneous transmit and receive operation on the first link using the first bandwidth and the second link using the second bandwidth. When the target interference parameter is equal to the interference parameter threshold, the first multi-link device may support performing the first operation and the second operation in a combined bandwidth of the first bandwidth and the second bandwidth, or may not support performing the first operation and the second operation in the combined bandwidth of the first bandwidth and the second bandwidth. In actual application, it may be set according to an actual situation.

When the interference parameter information includes a first interference parameter and a second interference parameter, and the first interference parameter is greater than the interference parameter threshold, the second device may determine that the first multi-link device does not support performing the first operation in a combined bandwidth of the first bandwidth and the second bandwidth, that is, does not support sending a PPDU on the first link using the first bandwidth concurrently with receiving a PPDU on the second link using the second bandwidth. If the first interference parameter is less than the interference parameter threshold, the second device may determine that the first multi-link device supports performing the first operation in a combined bandwidth of the first bandwidth and the second bandwidth, that is, supports sending a PPDU on the first link using the first bandwidth concurrently with receiving a PPDU on the second link using the second bandwidth. When the first interference parameter is equal to the interference parameter threshold, the first multi-link device may support performing the first operation in a combined bandwidth of the first bandwidth and the second bandwidth, or may not support performing the first operation in the combined bandwidth of the first bandwidth and the second bandwidth. In actual application, it may be set according to an actual situation.

Similarly, if the second interference parameter is greater than the interference parameter threshold, the second device may determine that the first multi-link device does not support performing the second operation in a combined bandwidth of the first bandwidth and the second bandwidth, that is, does not support sending a PPDU on the second link using the second bandwidth concurrently with receiving a PPDU on the first link using the first bandwidth. If the second interference parameter is less than the interference parameter threshold, the second device may determine that the first multi-link device supports performing the second operation in a combined bandwidth of the first bandwidth and the second bandwidth, that is, supports sending a PPDU on the second link using the second bandwidth concurrently with receiving a PPDU on the first link using the first bandwidth. When the second interference parameter is equal to the interference parameter threshold, the first multi-link device may support performing the second operation in a combined bandwidth of the first bandwidth and the second bandwidth, or may not support performing the second operation in the combined bandwidth of the first bandwidth and the second bandwidth. In actual application, it may be set according to an actual situation.

For ease of understanding, only a case in which the first interference parameter and the second interference parameter are compared with a same interference parameter threshold is described herein. In actual application, there may be a case in which there are two interference parameter thresholds, and the first interference parameter and the second interference parameter are respectively compared with corresponding interference parameter thresholds. For the case in which there are two interference parameter thresholds, refer to the corresponding descriptions in Embodiment 1. Details are not described herein again.

In some other feasible implementations, for (1b) Implementation 2 of the STR capability information, after receiving the STR capability information, the second device may obtain the interference parameter information indicated by the STR capability information. The second device obtains the interference parameter threshold, and may compare the interference parameter threshold with the interference parameter included in the interference parameter information.

When the interference parameter information includes one maximum interference parameter, and the maximum interference parameter is greater than the interference parameter threshold, the second device may determine that the first multi-link device does not support the simultaneous transmit and receive operation on the first link and the second link (or the link pair), that is, the first multi-link device does not support the simultaneous transmit and receive operation on the first link and the second link (or the link pair) in any bandwidth combination. If the maximum interference parameter is less than the interference parameter threshold, the second device may determine that the first multi-link device supports the simultaneous transmit and receive operation on the first link and the second link (or the link pair), that is, the first multi-link device supports the simultaneous transmit and receive operation on the first link and the second link (or the link pair) in any bandwidth combination. If the maximum interference parameter is equal to the interference parameter threshold, the second device may determine that the first multi-link device does not support the simultaneous transmit and receive operation on the first link and the second link (or the link pair), or may determine that the first multi-link device supports the simultaneous transmit and receive operation on the first link and the second link (or the link pair). In actual application, when the maximum interference parameter is equal to the interference parameter threshold, whether the first multi-link device supports the simultaneous transmit and receive operation on the first link and the second link (or the link pair) may be set based on an actual situation.

When the interference parameter information includes maximum interference parameter i and maximum interference parameter j, and maximum interference parameter i is greater than the interference parameter threshold, the second device may determine that the first multi-link device does not support the first operation, that is, the first multi-link device does not support sending a PPDU on the first link concurrently with receiving a PPDU on the second link in any bandwidth combination. If maximum interference parameter i is less than the interference parameter threshold, the second device may determine that the first multi-link device supports the first operation, that is, the first multi-link device supports sending a PPDU on the first link concurrently with receiving a PPDU on the second link in any bandwidth combination. If maximum interference parameter i is equal to the interference parameter threshold, the second device may determine that the first multi-link device supports the first operation, or may determine that the first multi-link device does not support the first operation. In actual application, when maximum interference parameter i is equal to the interference parameter threshold, whether the first multi-link device supports the first operation may be set based on an actual situation.

Similarly, if maximum interference parameter j is greater than the interference parameter threshold, the second device may determine that the first multi-link device does not support the second operation, that is, the first multi-link device does not support sending a PPDU on the second link concurrently with receiving a PPDU on the first link. If maximum interference parameter j is less than the interference parameter threshold, the second device may determine that the first multi-link device supports the second operation, that is, the first multi-link device supports sending a PPDU on the second link concurrently with receiving a PPDU on the first link. If maximum interference parameter j is equal to the interference parameter threshold, the second device may determine that the first multi-link device supports the second operation, or may determine that the first multi-link device does not support the second operation. In actual application, when maximum interference parameter j is equal to the interference parameter threshold, whether the first multi-link device supports the second operation may be set based on an actual situation.

For ease of understanding, only a case in which maximum interference parameter i and maximum interference parameter j are compared with a same interference parameter threshold is described herein. In actual application, there may be a case in which there are two interference parameter thresholds, and maximum interference parameter i and maximum interference parameter j are respectively compared with corresponding interference parameter thresholds. For the case in which there are two interference parameter thresholds, refer to the corresponding descriptions in Embodiment 1. Details are not described herein again.

It may be understood that, for a method for obtaining the interference parameter threshold by the second device, refer to the corresponding implementations in Embodiment 1. Details are not described herein again.

Optionally, the method further includes: The second device communicates with the first multi-link device based on the determined STR capability. Specifically, if it is determined that the first multi-link device supports the simultaneous transmit and receive operation on the first link and the second link, the second device may communicate with the first multi-link device on the first link and the second link in a simultaneous transmit and receive manner. Specifically, when the first multi-link device may send a PPDU on the first link, the second device sends a PPDU to the first multi-link device on the second link. In other words, the first multi-link device and the second device perform uplink communication through the first link concurrently with performing downlink communication through the second link. That is, the first link and the second link are used independently for communication. Alternatively, it may be understood that when the first multi-link device sends a PPDU on the second link, the second device sends a PPDU to the first multi-link device on the first link. In other words, the first multi-link device and the second device perform uplink communication through the first link, and perform downlink communication through the second link.

If it is determined that the first multi-link device does not support the simultaneous transmit and receive operation on the first link and the second link, in a communication process between the first multi-link device and the second device, PPDUs on the first link and the second link need to be aligned. That is, an end moment of a PPDU on the first link is aligned with an end moment of a PPDU on the second link. Specifically, the first multi-link device and the second device concurrently transmit uplink data or downlink data on the first link and the second link. For example, the first multi-link device simultaneously or concurrently sends PPDUs on the first link and the second link. Alternatively, the second device simultaneously or concurrently sends PPDUs to the first multi-link device on the first link and the second link. The end moment of the PPDU on the first link is the same as the end moment of the PPDU on the second link.

In this embodiment of this application, based on indicated interference parameters in different bandwidth combinations, STR capability information of two links in different bandwidth combinations may be determined based on the interference parameters in different bandwidth combinations. In the transition frequency spacing interval between Δf1 and Δf2, whether the simultaneous transmit and receive operation is supported on the two links may be determined with reference to bandwidths used on the two links. In addition, different procedures may be designed for different bandwidth combinations for subsequent communication, so that a communication manner is more flexible. In this embodiment of this application, an interference parameter is indicated with reference to a plurality of bandwidth combinations, and the interference parameter is used as an interference parameter of a link pair, so that signaling overheads can be reduced.

In an optional embodiment, the STR capability information may include first information and second information. The first information may be used to indicate interference parameter information between the first link using the first bandwidth and the second link using the second bandwidth. The second information may be used to indicate STR mode information of the first link using the first bandwidth and the second link using the second bandwidth. The STR mode information may include an STR mode, a non-STR mode, and a conditional STR mode. In this embodiment of this application, the STR mode information indicated by the second information is the conditional STR mode.

The conditional STR mode may mean that two links are STR under some conditions, and the two links are non-STR under some other conditions. In other words, the conditional STR mode is: When some transmit parameters are used on two links, transmission on one link does not cause significant interference to reception on the other link, that is, in this case, the two links are STR. However, when some other transmit parameters are used on the two links, transmission on one link causes significant interference to reception on the other link, that is, in this case, the two links are non-STR.

Optionally, if the STR mode information indicated by the second information is the STR mode or the non-STR mode, the first information may not be carried in the STR capability information or the first information may be left empty. That is, in the STR mode or the non-STR mode, an interference parameter between the two links do not need to be indicated.

Optionally, if the STR mode information indicated by the second information is the conditional STR mode, in a subsequent communication process, even if the first information indicates the interference parameter information between the first link and the second link, but if the second device does not limit a bandwidth of the second PPDU, that is, the bandwidth of the second PPDU is not affected by an interference parameter indicated by the first information, that is, the second PPDU is sent in any bandwidth, the second device determines that the first multi-link device is a non-STR MLD. In other words, in a subsequent communication process between the second device and the first multi-link device, end frames of two PPDUs simultaneously/concurrently sent on two links need to be aligned. Otherwise, if the second device limits the bandwidth of the second PPDU, that is, the bandwidth of the second PPDU is affected by the interference parameter indicated by the first information, that is, the second PPDU is sent in a bandwidth that is determined based on the interference parameter indicated by the first information. In this case, the second device may determine that the first multi-link device is an STR MLD. In other words, in a subsequent communication process between the second device and the first multi-link device, the second device may perform transmission on one link concurrently with performing reception on another link.

It may be understood that an operation procedure of the second device may be simplified when the bandwidth of the second PPDU is not limited, but transmission opportunities obtained by the second device decrease. More transmission opportunities may be obtained after the bandwidth of the second PPDU is limited, but bandwidth selection is limited. Optionally, whether the second device limits the bandwidth of the second PPDU may alternatively be indicated to the first multi-link device by using signaling. In this way, both the communication parties may use a same STR capability. The signaling may be carried in a management frame such as an association response frame, carried in a dedicated signaling frame, or carried in a piece of indication information carried in A-control. Specific implementations of the signaling are not limited in this embodiment of this application.

In a subsequent communication process, if the first multi-link device does not limit the bandwidth of the second PPDU, that is, the second PPDU is sent in any bandwidth, the first multi-link device may perform the same data sending and channel access procedures as performed by a non-STR MLD. For example, channel access performed by the first multi-link device on the first link affects channel access performed by the first multi-link device on the second link. Otherwise, if the first multi-link device limits the bandwidth of the second PPDU, and a link pair enters the conditional STR mode due to bandwidth limitation, the first multi-link device may use an independent channel for access and data transmission. For example, channel access performed by the first multi-link device on the first link is independent of, and does not affect channel access performed by the first multi-link device on the second link. Optionally, whether the first multi-link device limits the bandwidth of the second PPDU may alternatively be indicated to the second device by using signaling. In this way, both the communication parties may use a same STR capability. The signaling may be carried in a management frame such as an association request frame, carried in a dedicated signaling frame, or carried in a piece of indication information in A-control. Specific implementations of the signaling are not limited in this embodiment of this application.

Embodiment 3

According to the STR capability indication method provided in the embodiments of this application, whether a simultaneous transmit and receive operation is supported on two links (in different bandwidth combinations) is determined with reference to interference parameters corresponding to different bandwidth combinations on two links, and whether the simultaneous transmit and receive operation is supported on the two links (in different bandwidth combinations) is indicated by using STR capability indication information.

Embodiment 3 of this application and Embodiment 2 are specific to a same scenario, and both describe whether the simultaneous transmit and receive operation is supported on two links in the transition frequency spacing interval between Δf1 and Δf2 in FIG. 7. The difference lies in: In Embodiment 2, an interference parameter is indicated, and a peer end determines, based on the interference parameter and a threshold, whether the simultaneous transmit and receive operation is supported. In Embodiment 3 of this application, whether the simultaneous transmit and receive operation is supported is directly indicated, and the peer end (the second device) does not need to perform determining again, so that complexity of the peer end (the second device) can be reduced.

Figure 10:
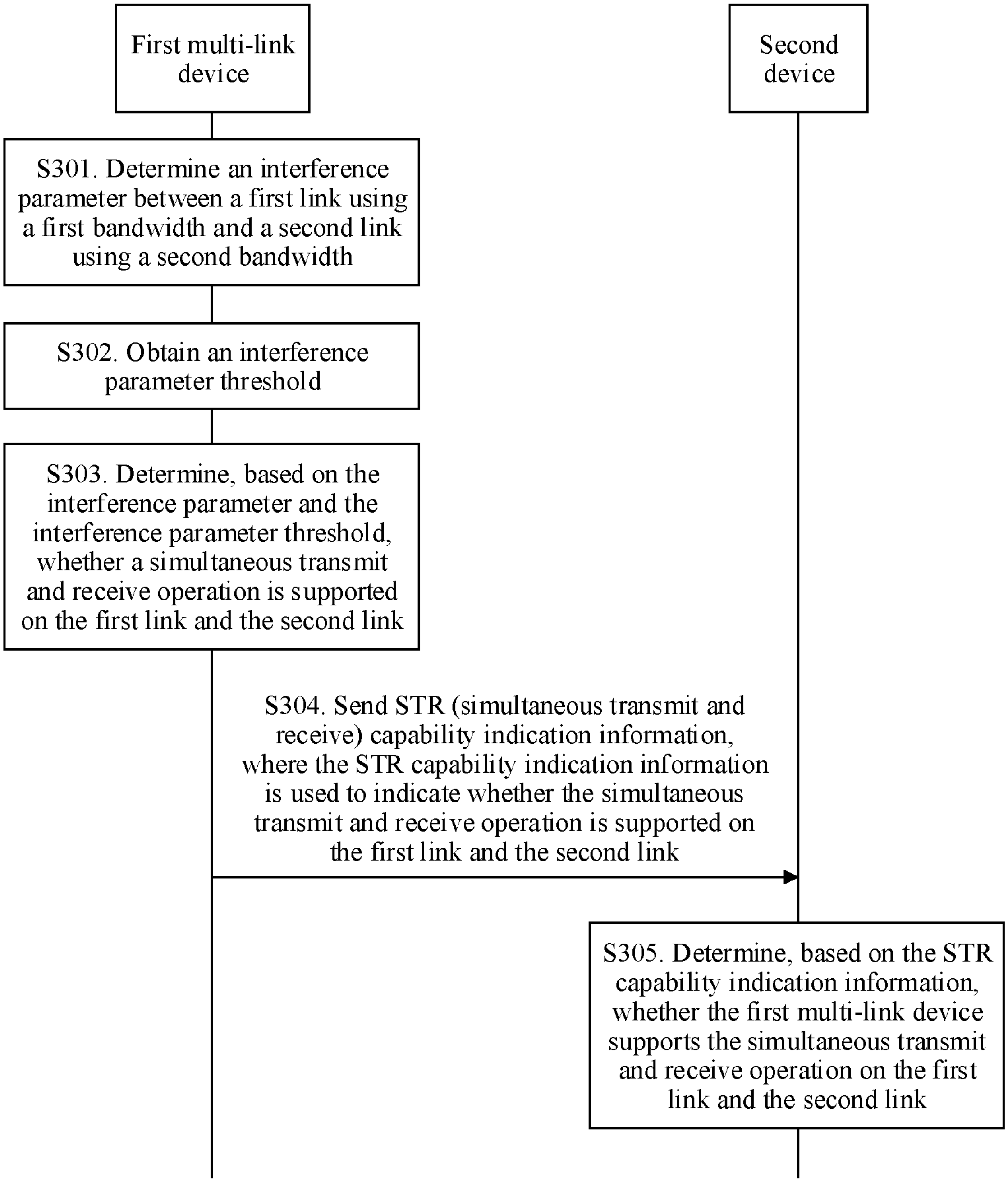
FIG. 10 is a third schematic flowchart of an STR capability indication method according to an embodiment of this application.

FIG. 10 is a third schematic flowchart of an STR capability indication method according to an embodiment of this application. As shown in FIG. 10, the STR capability indication method includes but is not limited to the following steps.

S301. A first multi-link device determines an interference parameter between a first link using a first bandwidth and a second link using a second bandwidth.

S302. The first multi-link device obtains an interference parameter threshold.

S303. The first multi-link device determines, based on the interference parameter and the interference parameter threshold, whether a simultaneous transmit and receive operation is supported on the first link and the second link.

S304. The first multi-link device sends STR capability indication information, where the STR capability indication information indicates whether the simultaneous transmit and receive operation is supported on the first link and the second link. Correspondingly, the second device receives the STR capability indication information from the first multi-link device.

Optionally, for specific implementations of the first bandwidth and the second bandwidth in this embodiment of this application, refer to the five implementations of the first bandwidth and the second bandwidth in Embodiment 2. Details are not described herein again.

Optionally, the simultaneous transmit and receive operation may include a first operation and a second operation. The first operation may be that the first multi-link device transmits a first PPDU on the first link concurrently with receiving a second PPDU on the second link. The second operation may be that the first multi-link device transmits a second PPDU on the second link concurrently with receiving a first PPDU on the first link. A bandwidth of the first PPDU may be equal to the first bandwidth, and a bandwidth of the second PPDU may be equal to the second bandwidth.

Optionally, for step S301, the first multi-link device determines an interference parameter corresponding to a bandwidth combination (for example, a bandwidth combination of the first bandwidth and the second bandwidth). One bandwidth combination may correspond to one interference parameter, or may correspond to two interference parameters.

When one bandwidth combination corresponds to one interference parameter, the interference parameter is a maximum value of a first interference parameter and a second interference parameter in a same bandwidth combination. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a first-link-to-second-link (link 1 to link 2/link 1→link 2) cross-link interference parameter. The second interference parameter may be described as a second-link-to-first-link (link 2 to link 1/link 2→link 1) cross-link interference parameter.

When one bandwidth combination corresponds to two interference parameters, the two interference parameters may be a first interference parameter and a second interference parameter in a same bandwidth combination. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a first-link-to-second-link (link 1 to link 2/link 1→link 2) cross-link interference parameter. The second interference parameter may be described as a second-link-to-first-link (link 2 to link 1/link 2→link 1) cross-link interference parameter.

It may be understood that the bandwidth combination may be any bandwidth combination of the first bandwidth and the second bandwidth in Implementation 1 to Implementation 5 in Embodiment 2.

Optionally, in this case, the bandwidth combination, that is, the first bandwidth and the second bandwidth, may be further carried in the STR capability indication information.

Optionally, for step S301, the first multi-link device may determine a maximum interference parameter of a link pair (the first link and the second link) in at least one bandwidth combination. The first bandwidth and the second bandwidth are a bandwidth combination corresponding to the maximum interference parameter. There may be one or two maximum interference parameters of the link pair in the at least one bandwidth combination. This is because one bandwidth combination may correspond to one or two interference parameters. When there is one maximum interference parameter, the maximum interference parameter is a maximum value of at least one interference parameter corresponding to at least one bandwidth combination. It may be understood that the maximum interference parameter may be expressed in a mathematical form as: max{interference parameter (bandwidth combination)}.

When there are two maximum interference parameters, for example, maximum interference parameter i and maximum interference parameter j, maximum interference parameter i is a maximum value of at least one first interference parameter corresponding to at least one bandwidth combination, and maximum interference parameter j is a maximum value of at least one second interference parameter corresponding to the at least one bandwidth combination. The first interference parameter may be a cross-link interference parameter, of the first link to the second link, measured when the first multi-link device performs the first operation. The second interference parameter may be a cross-link interference parameter, of the second link to the first link, measured when the first multi-link device performs the second operation. The first interference parameter may also be described as a first-link-to-second-link (link 1 to link 2/link 1→link 2) cross-link interference parameter. The second interference parameter may be described as a second link to first link (link 2 to link 1/link 2→link 1) cross-link interference parameter. It may be understood that maximum interference parameter i may be expressed in a mathematical form as: max {link 1 to link 2/link 1→link 2 interference parameter (bandwidth combination)}; maximum interference parameter j may be expressed in a mathematical form as: max{link 2 to link 1/link 2→link 1 interference parameter (bandwidth combination)}.

The at least one bandwidth combination may be all bandwidth combinations of the first bandwidth and the second bandwidth in any one of Implementation 1 to Implementation 3 in Embodiment 2.

Optionally, for step S302, there are two methods for the first multi-link device to obtain the interference parameter threshold. One method is that the first multi-link device locally obtains the interference parameter threshold (or an interference level threshold). The other method is that the second device broadcasts the interference parameter threshold (or an interference level threshold), and correspondingly the first multi-link device receives the interference parameter threshold (or the interference level threshold) from the second device. It may be understood that when the interference parameter threshold (or the interference level threshold) is broadcast by the second device, all non-AP MLDs or non-AP MLDs associated with a same AP MLD may use a same threshold to determine an STR/non-STR capability.

The interference parameter threshold (or the interference level threshold) may be a threshold, or a single value unrelated to a transmit parameter on a link. That is, the interference parameter threshold (or the interference level threshold) is used in any bandwidth combination. The interference parameter threshold (or the interference level threshold) may be a group of thresholds, or a group of values related to a transmit parameter on a link. That is, interference parameter thresholds (or interference level thresholds) in different bandwidth combinations are different.

Optionally, for a specific implementation of step S303, refer to the corresponding implementation of step S204 in Embodiment 2. Details are not described herein again.

Optionally, after it is determined whether the simultaneous transmit and receive operation is supported on the first link and the second link, the STR capability indication information may directly indicate an STR capability on the first link and the second link. In this embodiment of this application, the STR capability on two links is directly indicated, so that signaling overheads can be reduced. The STR capability indication information may be carried in one radio frame. Specifically, if the first multi-link device is a non-AP MLD, the STR capability indication information may be carried in a probe request frame or an association request frame. If the first multi-link device is an AP MLD, the STR capability indication information may be carried in a beacon frame, a probe response frame, or an association response frame. The STR capability indication information may be specifically carried in an EHT capability element.

Figure 11A:
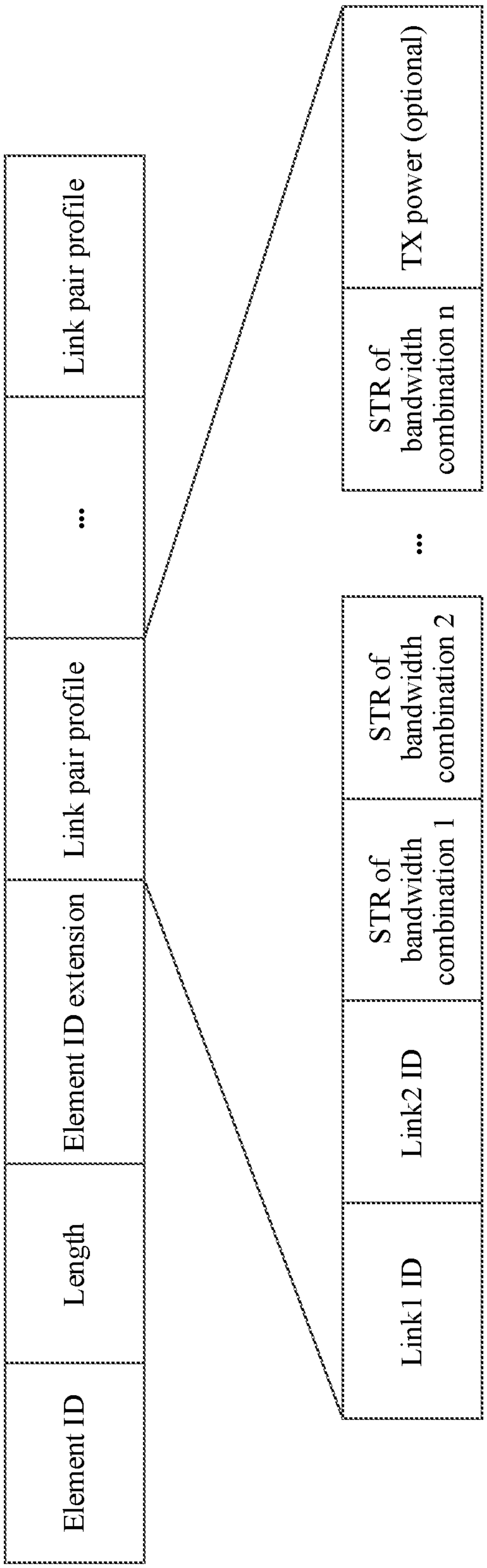
FIG. 11*a* is a schematic diagram of a first frame structure according to an embodiment of this application.

Optionally, the STR capability indication information may alternatively be carried in a new element field. FIG. 11*a* is a schematic diagram of a first frame structure according to an embodiment of this application. As shown in FIG. 11*a*, the frame structure includes an element identifier field, a length field, an element identifier extension field, and at least one link pair profile field. Each link pair profile field includes STR-related information of one link pair in at least one bandwidth combination, for example, two link identifier subfields and at least one STR indication field. Each STR indication field indicates an STR capability of a link pair in a bandwidth combination.

Figure 11B:
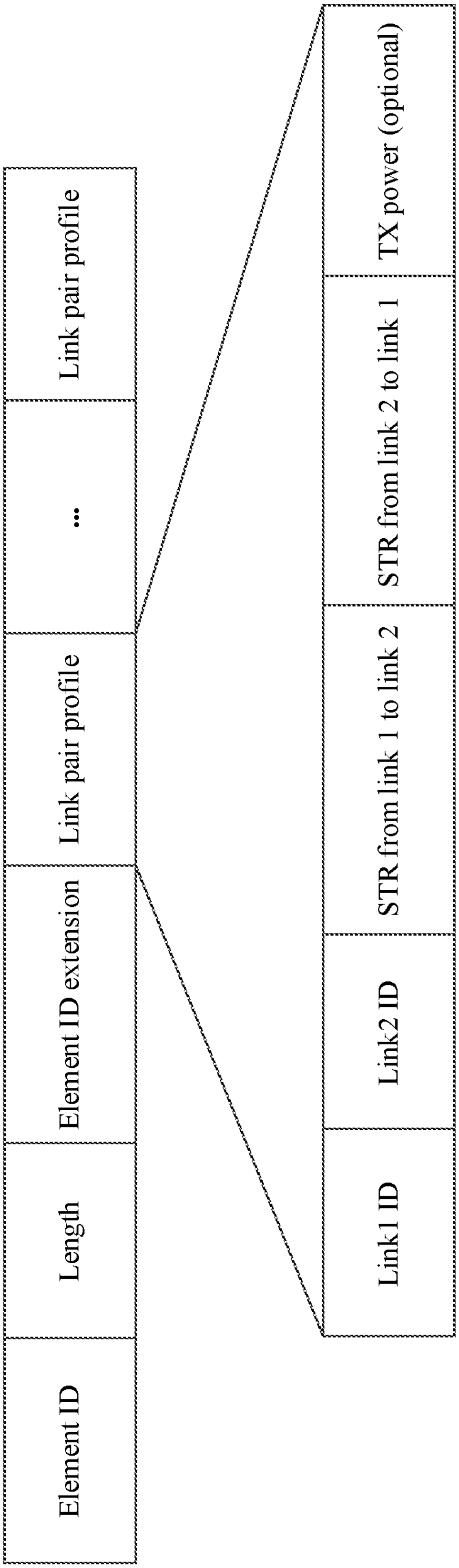
FIG. 11*b* is a schematic diagram of a second frame structure according to an embodiment of this application.

FIG. 11*b* is a schematic diagram of a second frame structure according to an embodiment of this application. As shown in FIG. 11*b*, the frame structure includes an element identifier field, a length field, an element identifier extension field, and at least one link pair profile field. Each link pair profile field includes STR-related information of one link pair in different directions, for example, two link identifier subfields and two STR indication fields, respectively indicating an STR capability of sending a PPDU on link 1 concurrently with receiving another PPDU on link 2, and an STR capability of sending a PPDU on link 2 concurrently with receiving another PPDU on link 1.

In an optional embodiment, the STR capability indication information may include first indication information and second indication information. The first indication information may be used to indicate whether a simultaneous transmit and receive operation is supported on a first link and a second link, and the second indication information may be used to indicate interference parameter information between the first link and the second link. The interference parameter information may include the interference parameter determined in step S301. The first indication information may be carried in an EHT capability element, and the second indication information may be carried in an EHT operation element.

For example, Table 7 shows interference parameters corresponding to some bandwidth combinations. The first row represents the second bandwidth, and the first column represents the first bandwidth. It is assumed that the first indication information indicates that simultaneous transmit and receive operation is not supported on the first link and the second link, that is, the two links are non-STR. It can be learned from the interference parameter indicated by the second indication information or the example in Table 7 that, when a bandwidth not greater than 20 MHz is used on one link, the simultaneous transmit and receive operation is supported on the first link and the second link, that is, the two links are STR. In other words, the second device may learn, based on the interference parameter, that if a bandwidth of 20 MHz is used on a link, the first multi-link device may perform simultaneous transmission and reception on two links without interference. In this case, the second device may use a bandwidth of 20 MHz or a resource unit (RU) on the link for scheduling, and end moments of PPDUs on the two links do not need to be aligned. As shown in Table 7, when a bandwidth of 40 MHz is used on the first link, a bandwidth (or an RU) of the second link is limited to a 40 MHz, and a simultaneous transmit and receive operation is supported on the first link and the second link, that is, the two links are STR.

Therefore, in this embodiment of this application, whether the simultaneous transmit and receive operation is supported on the first link and the second link is indicated, and the interference parameter information between the first link and the second link is also indicated. Therefore, an actual STR capability may be determined based on different bandwidth combinations, and more flexible communication modes can be implemented for different bandwidth combinations.

TABLE 7

| Interference parameters corresponding to some bandwidth combinations | | | | |
|---|---|---|---|---|
| | 20 MHz | 40 MHz | 80 MHz | 160 MHz |
| 20 MHz | <−82 dBm | <−82 dBm | <−82 dBm | <−82 dBm |
| 40 MHz | <−82 dBm | <−82 dBm | −72 dBm | −52 dBm |
| 80 MHz | <−82 dBm | −72 dBm | −62 dBm | −42 dBm |
| 160 MHz | <−82 dBm | −52 dBm | −42 dBm | ≥−42 dBm |

In another optional embodiment, the STR capability indication information may include first indication information and second indication information. The first indication information may be used to indicate STR mode information of the first link and the second link, and the second indication information may be used to indicate the interference parameter information between the first link and the second link. The STR mode information includes an STR mode or a non-STR mode. The STR mode indicates that a simultaneous transmit and receive operation is supported on the first link and the second link. The non-STR mode indicates that a simultaneous transmit and receive operation is not supported on the first link and the second link. The interference parameter information may include the interference parameter determined in step S301. After receiving the STR capability indication information, the second device may determine, based on the interference parameter indicated by the second indication information, whether the first link and the second link are in a conditional STR mode. When the first link and the second link are in the conditional STR mode, the STR mode information indicated by the first indication information may be the non-STR mode. In other words, the STR capability indication information includes two modes: STR/non-STR, and includes the interference parameter determined in step S301. The second device may determine, based on the interference parameter, whether a corresponding MLD is conditional STR. When an MLD is conditional STR, it is recommended that the STR capability indication information include the non-STR mode.

Optionally, in a subsequent communication process, even if the second indication information indicates the interference parameter information between the first link and the second link, but if the second device does not limit the bandwidth of the second PPDU, that is, the bandwidth of the second PPDU is not affected by the interference parameter indicated by the second indication information, that is, the second PPDU is sent in any bandwidth, the second device determines the first multi-link device as a non-STR MLD. In other words, in a subsequent communication process between the second device and the first multi-link device, end frames of two PPDUs simultaneously/concurrently sent on two links need to be aligned. Otherwise, if the second device limits the bandwidth of the second PPDU, that is, the bandwidth of the second PPDU is affected by the interference parameter indicated by the second indication information, that is, the second PPDU is sent in a bandwidth that is determined based on the interference parameter indicated by the second indication information. In this case, the second device may determine that the first multi-link device is an STR MLD. In other words, in a subsequent communication process between the second device and the first multi-link device, the second device may perform transmission on one link concurrently with performing reception on another link.

It may be understood that an operation procedure of the second device may be simplified when the bandwidth of the second PPDU is not limited, but transmission opportunities obtained by the second device decrease. More transmission opportunities may be obtained after the bandwidth of the second PPDU is limited, but bandwidth selection is limited. Optionally, whether the second device limits the bandwidth of the second PPDU may alternatively be indicated to the first multi-link device by using signaling. In this way, both the communication parties may use a same STR capability. The signaling may be carried in a management frame such as an association response frame, carried in a dedicated signaling frame, or carried in a piece of indication information carried in A-control. Specific implementations of the signaling are not limited in this embodiment of this application.

In a subsequent communication process, if the first multi-link device does not limit the bandwidth of the second PPDU, that is, the second PPDU is sent in any bandwidth, the first multi-link device may perform the same data sending and channel access procedures as performed by a non-STR MLD. For example, channel access performed by the first multi-link device on the first link affects channel access performed by the first multi-link device on the second link. Otherwise, if the first multi-link device limits the bandwidth of the second PPDU, and a link pair enters the conditional STR mode due to bandwidth limitation, the first multi-link device may use an independent channel for access and data transmission. For example, channel access performed by the first multi-link device on the first link is independent of, and does not affect channel access performed by the first multi-link device on the second link. Optionally, whether the first multi-link device limits the bandwidth of the second PPDU may alternatively be indicated to the second device by using signaling. In this way, both the communication parties may use a same STR capability. The signaling may be carried in a management frame such as an association request frame, carried in a dedicated signaling frame, or carried in a piece of indication information in A-control. Specific implementations of the signaling are not limited in this embodiment of this application.

S305. The second device determines, based on the STR capability indication information, whether the first multi-link device supports a simultaneous transmit and receive operation on the first link and the second link.

Specifically, if the STR capability indication information indicates that the simultaneous transmit and receive operation is not supported on the first link and the second link, correspondingly after the second device receives the STR capability indication information, the second device may learn, by parsing the STR capability indication information, that the first multi-link device does not support the simultaneous transmit and receive operation on the first link and the second link. If the STR capability indication information indicates that the simultaneous transmit and receive operation is supported on the first link and the second link, correspondingly after the second device receives the STR capability indication information, the second device may learn, by parsing the STR capability indication information, that the first multi-link device supports the simultaneous transmit and receive operation on the first link and the second link.

Optionally, the method further includes: The second device communicates with the first multi-link device based on the determined STR capability. Specifically, if the first multi-link device supports the simultaneous transmit and receive operation on the first link and the second link, the second device may communicate with the first multi-link device on the first link and the second link in a simultaneous transmit and receive manner. Specifically, when the first multi-link device may send a PPDU on the first link, the second device sends a PPDU to the first multi-link device on the second link. In other words, the first multi-link device and the second device perform uplink communication through the first link concurrently with performing downlink communication through the second link. That is, the first link and the second link are used independently for communication. Alternatively, it may be understood that when the first multi-link device sends a PPDU on the second link, the second device sends a PPDU to the first multi-link device on the first link. In other words, the first multi-link device and the second device perform uplink communication through the first link, and perform downlink communication through the second link.

If the first multi-link device does not support the simultaneous transmit and receive operation on the first link and the second link, in a communication process between the first multi-link device and the second device, PPDUs on the first link and the second link need to be aligned. That is, an end moment of a PPDU on the first link is aligned with an end moment of a PPDU on the second link. Specifically, the first multi-link device and the second device concurrently transmit uplink data or downlink data on the first link and the second link. For example, the first multi-link device simultaneously or concurrently sends PPDUs on the first link and the second link. Alternatively, the second device simultaneously or concurrently sends PPDUs to the first multi-link device on the first link and the second link. The end moment of the PPDU on the first link is the same as the end moment of the PPDU on the second link.

In this embodiment of this application, an STR capability on the first link and the second link in different bandwidth combinations is directly indicated, so that signaling overheads can be reduced, and calculation complexity of a peer end can be reduced.

Embodiment 4

This embodiment of this application provides an STR capability indication method, so that whether a simultaneous transmit and receive operation is supported on two links may be determined with reference to strength of a received signal.

In Embodiment 2 and Embodiment 3 above, interference between two links is mainly considered, and an STR capability is determined based on an interference level. In Embodiment 4 of this application, the STR capability is determined based on an SINR. It may be understood that correct reception of one piece of data depends on a signal to interference plus noise ratio (SINR), and the SINR is affected by transmit power and a spatial distance between transmit and receive ends. Therefore, in Embodiment 4 of this application, the STR capability indication method provided in this embodiment of this application is mainly described with reference to the SINR.

It may be further understood that most PPDU frames do not carry transmit power information, and in many cases, a PPDU is sent at maximum power or fixed power. Therefore, in Embodiment 4 of this application, it is assumed that the transmit power remains unchanged, and an STR capability between two links is considered under a condition of maximum transmit power or fixed transmit power. The distance between the transmit and receive ends also affects the STR capability. For a mobile terminal, the distance between the transmit and receive ends frequently changes. Therefore, in Embodiment 4 of this application, the STR capability in a movement scenario is also considered.

It may be further understood that, because a link is often adaptively adjusted, that is, an MCS is adjusted, based on a channel status and a packet loss rate, how to determine the STR capability based on different MCSs is not described in this application.

Figure 12:
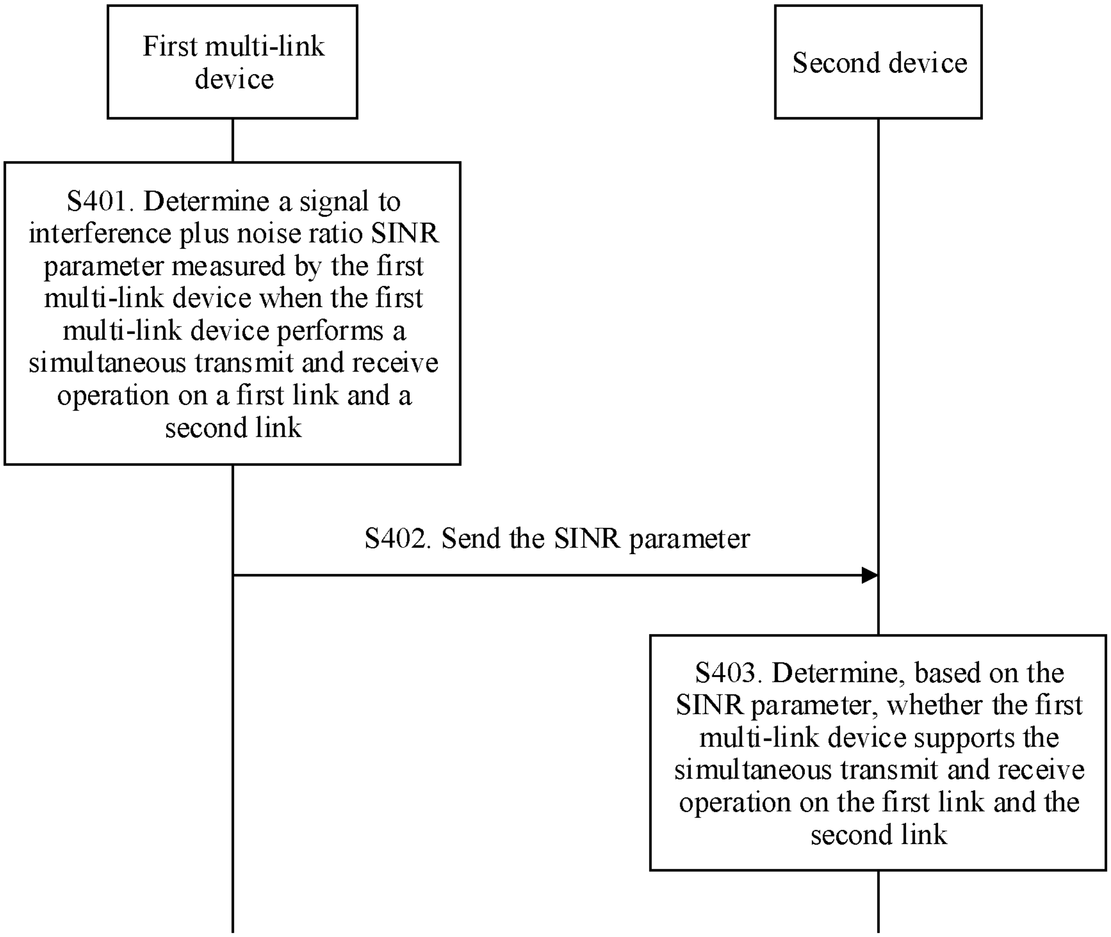
FIG. 12 is a fourth schematic flowchart of an STR capability indication method according to an embodiment of this application.

FIG. 12 is a fourth schematic flowchart of an STR capability indication method according to an embodiment of this application. As shown in FIG. 12, the STR capability indication method includes but is not limited to the following steps.

S401. A first multi-link device determines a signal to interference plus noise ratio SINR parameter measured by the first multi-link device when the first multi-link device performs a simultaneous transmit and receive operation on a first link and a second link.

S402. The first multi-link device sends the SINR parameter. Correspondingly, a second device receives the SINR parameter from the first multi-link device.

S403. The second device determines, based on the SINR parameter, whether the first multi-link device supports the simultaneous transmit and receive operation on the first link and the second link.

Specifically, there are three implementations for the SINR parameter. When SINR parameters are different, manners used by the second device to determine whether the first multi-link device supports the simultaneous transmit and receive operation on the first link and the second link are also different. The following provides descriptions with reference to specific implementations of the SINR parameter.

(1) Implementation 1 of the SINR Parameter

Specifically, the SINR parameter may include one parameter, or may include two parameters. The following separately describes a case of one parameter and a case of two parameters.

When the SINR parameter includes one parameter, the SINR parameter includes an SINR value, and the SINR value may be a maximum value of an SINR value on the first link and an SINR value on the second link. The first multi-link device sends a PPDU on the first link concurrently with receiving a PPDU on the second link, and measures, on the second link, the SINR value on the second link. The first multi-link device sends a PPDU on the second link concurrently with receiving a PPDU on the first link, and measures, on the first link, the SINR value on the first link.

Optionally, the first multi-link device further sends an SINR threshold to the second device. That is, the SINR value and the SINR threshold may be sent by using two pieces of signaling. Optionally, the SINR parameter further includes an SINR threshold, that is, the first multi-link device sends the SINR value and the SINR threshold by using one piece of signaling.

The first multi-link device may send the SINR parameter on the first link, and the second device may record a received signal strength indicator (RSSI) on the first link when receiving the SINR parameter, and use the RSSI as a reference RSSI. It may be understood that, after receiving the SINR parameter, the second device may obtain the SINR threshold, and may compare the SINR value included in the SINR parameter with the SINR threshold. When the SINR value is greater than the SINR threshold, the second device determines that the first multi-link device currently supports the simultaneous transmit and receive operation on the first link and the second link. When the SINR value is less than the SINR threshold, the second device determines that the first multi-link device currently supports the simultaneous transmit and receive operation on the first link and the second link. When the SINR value is equal to the SINR threshold, the second device may determine that the first multi-link device currently supports the simultaneous transmit and receive operation on the first link and the second link, or may determine that the first multi-link device currently does not support the simultaneous transmit and receive operation on the first link and the second link. For a method for obtaining the SINR threshold by the second device, refer to the method for obtaining the interference parameter threshold by the second device in Embodiment 1. Details are not described herein again.

Optionally, when the first multi-link device moves, the first multi-link device may send a null data frame, for example, a null data packet (NDP), on the first link. The second device may record an RSSI on the first link when receiving the null data packet, calculate a difference between the RSSI and the reference RSSI, and use the difference as an RSSI change amount. It may be understood that when the transmit power of the first multi-link device remains unchanged, the RSSI change amount is equivalent to an SINR change amount. For example, if the RSSI change amount is −5 dBm, the SINR change amount is also −5 dBm. Therefore, in this embodiment of this application, it is assumed that the transmit power remains unchanged before and after the first multi-link device moves. Therefore, the second device may use a value obtained by adding the RSSI change amount to a previous SINR value as a current SINR value. The second device compares the current SINR value with the SINR threshold. When the current SINR value is greater than the SINR threshold, the second device determines that the first multi-link device supports the simultaneous transmit and receive operation on the first link and the second link after the first multi-link device moves. When the current SINR value is less than the SINR threshold, the second device determines that the first multi-link device supports the simultaneous transmit and receive operation on the first link and the second link after the first multi-link device moves. When the current SINR value is equal to the SINR threshold, the second device may determine that the first multi-link device supports the simultaneous transmit and receive operation on the first link and the second link after the first multi-link device moves, or may determine that the first multi-link device does not support the simultaneous transmit and receive operation on the first link and the second link after the first multi-link device moves.

In this embodiment of this application, it is assumed that path losses on the first link and the second link are the same or similar. Therefore, the second device may infer an SINR change on the second link based on an RSSI change on the first link, and similarly, may also infer the SINR change on the second link based on the RSSI change on the second link. Specifically, the first multi-link device sends the SINR parameter on the second link, and the second device may record an RSSI on the second link when receiving the SINR parameter, and use the RSSI as a reference RSSI. Then, when the first multi-link device moves, the SINR change on the second link is inferred based on the RSSI change on the second link. For details, refer to the foregoing implementation of inferring the SINR change on the second link based on the RSSI change on the first link. Details are not described herein.

The SINR value may be a value not related to a bandwidth, may be a group of values measured based on different bandwidth combinations, or may be an SINR value of another bandwidth combination inferred based on a value of a basic parameter combination (for example, two links have a bandwidth of 20 MHz).

When the SINR parameter includes two parameters, the SINR parameter includes a first SINR parameter and a second SINR parameter. The first SINR parameter is an SINR parameter of the first link to the second link when the first multi-link device performs a first operation. The second SINR parameter is an SINR parameter of the second link to the first link when the first multi-link device performs a second operation. The first operation is that the first multi-link device sends a first PPDU on the first link concurrently with receiving a second PPDU on the second link. The second operation is that the first multi-link device sends a second PPDU on the second link concurrently with receiving a first PPDU on the first link. The first SINR parameter includes a first SINR value, and the second SINR parameter includes a second SINR value.

Optionally, the first multi-link device further sends an SINR threshold to the second device. That is, the SINR value and the SINR threshold may be sent by using two pieces of signaling. Optionally, the SINR parameter further includes an SINR threshold, that is, the first multi-link device sends the SINR value and the SINR threshold by using one piece of signaling. There may be one or two SINR thresholds. When there is one SINR threshold, both the first SINR value and the second SINR value are compared with the SINR threshold. When there are two SINR thresholds, for example, a first SINR threshold and a second SINR threshold, the first SINR value and the second SINR value may be compared with respective corresponding thresholds. For example, the first SINR value is compared with the first SINR threshold, and the second SINR value is compared with the second SINR threshold. The first SINR threshold is an SINR threshold of the first link to the second link when the first multi-link device performs the first operation. The second SINR threshold is an SINR threshold of the second link to the first link when the first multi-link device performs the second operation. For ease of description, the following uses one threshold as an example for description.

The first multi-link device may send the first SINR parameter on the first link, and the second device may record an RSSI on the first link when receiving the first SINR parameter, and use the RSSI as a first reference RSSI. The first multi-link device may send the second SINR parameter on the second link, and the second device may record an RSSI on the second link when receiving the second SINR parameter, and use the RSSI as a second reference RSSI. It may be understood that, after receiving the SINR parameter, the second device may obtain the SINR threshold, and may separately compare the first SINR value and the second SINR value that are included in the first SINR parameter with the SINR threshold. When the first SINR value is greater than the SINR threshold, the second device determines that the first multi-link device currently supports the first operation on the first link and the second link. When the first SINR value is less than the SINR threshold, the second device determines that the first multi-link device currently supports the first operation on the first link and the second link. When the first SINR value is equal to the SINR threshold, the second device may determine that the first multi-link device currently supports the first operation on the first link and the second link, or may determine that the first multi-link device currently does not support the first operation on the first link and the second link. Similarly, when the second SINR value is greater than the SINR threshold, the second device determines that the first multi-link device currently supports the second operation on the first link and the second link. When the second SINR value is less than the SINR threshold, the second device determines that the first multi-link device currently supports the second operation on the first link and the second link. When the second SINR value is equal to the SINR threshold, the second device may determine that the first multi-link device currently supports the second operation on the first link and the second link, or may determine that the first multi-link device currently does not support the second operation on the first link and the second link. It may be understood that the simultaneous transmit and receive operation may include the first operation and the second operation. For a method for obtaining the SINR threshold by the second device, refer to the method for obtaining the interference parameter threshold by the second device in Embodiment 1. Details are not described herein again.

Optionally, when the first multi-link device moves, for an implementation used by the second device to determine whether the first operation is supported on the first link and the second link after the first multi-link device moves, and whether the second operation is supported, refer to the corresponding descriptions in the case in which the SINR parameter includes one parameter.

In an optional embodiment, the SINR parameter may further include transmit power. The first multi-link device may obtain the transmit power of the second device by receiving a beacon frame or a frame carrying the transmit power, or adding a dedicated training frame.

(2) Implementation 2 of the SINR Parameter

Specifically, the SINR parameter may include one parameter, or may include two parameters. The following separately describes a case of one parameter and a case of two parameters.

When the SINR parameter includes one parameter, the SINR parameter includes an SINR margin. The SINR margin is a difference between the SINR value and the SINR threshold. The SINR margin refers to an amount of dB to be reduced based on a current SINR, to reach the SINR threshold. For example, if the SINR margin is 10 dB, it indicates that when a new SINR decreases by 10 dB compared with the current SINR, the two links change from STR to non-STR, that is, change from supporting the simultaneous transmit and receive operation to not supporting the simultaneous transmit and receive operation. It may be understood that, when it is assumed that the transmit power of the first multi-link device remains unchanged, when the received RSSI decreases by 10 dB, the SINR also decreases by 10 dB. It may be further understood that the SINR margin may also be a negative number. When the SINR margin is a negative number, it indicates that the two links are in a non-STR state at a current moment, that is, the two links do not support the simultaneous transmit and receive operation. For example, assuming that the SINR margin is −5 dB, an increase of 5 dB in the RSSI means an increase of 5 dB in the SINR. In this case, the two links change from the non-STR state to the STR state, that is, change from not supporting the simultaneous transmit and receive operation to supporting the simultaneous transmit and receive operation.

Optionally, the SINR threshold may be obtained by the first multi-link device from local storage, or may be broadcast by the second device, or may be specified in a standard or a protocol. It may be understood that when the SINR threshold is broadcast by the second device or specified in a standard, all non-AP MLDs or non-AP MLDs in one BSS may use a unified threshold to determine an STR/non-STR capability.

The first multi-link device may send the SINR parameter on the first link, and the second device may record an RSSI on the first link when receiving the SINR parameter, and use the RSSI as a reference RSSI. After receiving the SINR parameter, the second device detects whether the SINR margin included in the SINR parameter is a positive number or a negative number. If the SINR margin is a positive number, the second device determines that the first multi-link device currently supports the simultaneous transmit and receive operation on the first link and the second link. If the SINR margin is a negative number, the second device determines that the first multi-link device currently does not support the simultaneous transmit and receive operation on the first link and the second link.

Optionally, when the first multi-link device moves, the first multi-link device may send an NDP on the first link. The second device may record an RSSI on the first link when receiving the NDP, calculate a difference between the RSSI and the reference RSSI, and use the difference as an RSSI change amount. It may be understood that when the transmit power of the first multi-link device remains unchanged, the RSSI change amount is equivalent to an SINR change amount. Therefore, in this embodiment of this application, it is assumed that the transmit power remains unchanged before and after the first multi-link device moves. The second device compares an absolute value of the RSSI change amount with a previously received SINR margin. If the absolute value of the RSSI change amount is greater than an absolute value of the SINR margin, the second device determines that an STR capability of the first multi-link device on the first link and the second link does not change before and after the first multi-link device moves. That is, if the simultaneous transmit and receive operation is supported before the movement, the simultaneous transmit and receive operation is also supported after the movement. If the simultaneous transmit and receive operation is not supported before the movement, the simultaneous transmit and receive operation is not supported after the movement. If the absolute value of the RSSI change amount is less than an absolute value of the SINR margin, the second device determines that an STR capability of the first multi-link device on the first link and the second link changes before and after the first multi-link device moves. That is, if the simultaneous transmit and receive operation is supported before the movement, the simultaneous transmit and receive operation is not supported after the movement. If the simultaneous transmit and receive operation is not supported before the movement, the simultaneous transmit and receive operation is supported after the movement. If the absolute value of the RSSI change amount is equal to an absolute value of the SINR margin, the second device determines that an STR capability of the first multi-link device on the first link and the second link before and after the first multi-link device moves may change, or may not change.

For example, assuming that the SINR margin is −8 dB, it indicates that the SINR threshold is reached if a new SINR decreases by 8 dB. Assuming that the RSSI change amount is −10 dB, it indicates that a new RSSI decreases by 10 dB, that is, a new SINR decreases by 10 dB. Because the absolute value of the RSSI change amount, 10, is greater than the absolute value of the SINR margin, 8, the STR capability changes. Assuming that the SINR margin is 10 dB, it indicates that the SINR threshold is reached if a new SINR increases by 10 dB. Assuming that the RSSI change amount is 5 dB, it indicates that a new RSSI increases by 5 dB, that is, a new SINR increases by 5 dB, and it also indicates that the new SINR is still less than the SINR threshold. Because the absolute value of the RSSI change amount, 5, is less than the absolute value of the SINR margin, 10, the STR capability does not change.

It may be understood that, in addition to inferring the SINR change on the second link based on the RSSI change on the first link, the second device may also infer the SINR change on the second link based on the RSSI change on the second link. For details, refer to the implementations described above. Details are not described herein.

When the SINR parameter includes two parameters, the SINR parameter includes a first SINR parameter and a second SINR parameter, the first SINR parameter includes a first SINR margin, and the second SINR parameter includes a second SINR margin. There may be one or two SINR thresholds. When there is one SINR threshold, the first SINR margin is a difference between the first SINR value and the SINR threshold, and the second SINR margin is a difference between the second SINR value and the SINR threshold. When there are two SINR thresholds, for example, a first SINR threshold and a second SINR threshold, the first SINR margin is a difference between the first SINR value and the first SINR threshold, and the second SINR margin is a difference between the second SINR value and the second SINR threshold. The first SINR threshold is an SINR threshold of the first link to the second link when the first multi-link device performs the first operation, and the second SINR threshold is an SINR threshold of the second link to the first link when the first multi-link device performs the second operation. For ease of description, the following uses one threshold as an example for description. The first operation is that the first multi-link device sends a first PPDU on the first link concurrently with receiving a second PPDU on the second link. The second operation is that the first multi-link device sends a second PPDU on the second link concurrently with receiving a first PPDU on the first link.

Optionally, the SINR threshold may be obtained by the first multi-link device from local storage, or may be broadcast by the second device, or may be specified in a standard or a protocol.

Optionally, the simultaneous transmit and receive operation includes the first operation and the second operation.

When the SINR parameter includes two parameters, for an implementation used by the second device to determine, based on the SINR parameter, whether the simultaneous transmit and receive operation is supported on the first link and the second link, refer to the corresponding descriptions in (1) Implementation 1 of the SINR parameter. Details are not described herein again.

(3) Implementation 3 of the SINR Parameter

Specifically, the SINR parameter may include one group of parameters, or may include two groups of parameters. The following separately describes a case of a group of parameters and a case of two groups of parameters.

When the SINR parameter includes one group of parameters, the SINR parameter includes an SINR value and an SINR margin. A meaning of the SINR value is the same as a meaning of the SINR value in (1) Implementation 1 of the SINR parameter described above. A meaning of the SINR margin is the same as a meaning of the SINR margin in (2) Implementation 2 of the SINR parameter described above. Details are not described herein again.

It may be understood that the second device can determine, based on the SINR margin, whether the first multi-link device currently supports the simultaneous transmit and receive operation on the first link and the second link. An appropriate transmit parameter (for example, an MCS) may be selected based on the SINR value. For example, when the SINR is high, a high MCS may be used. If the SINR is low, a low MCS can be used.

It may be further understood that in this embodiment of this application, both the SINR value and the SINR margin are indicated, so that more accurate reference information can be provided for the second device, and the second device can subsequently select a transmit parameter, a more flexible communication manner, and the like.

When the SINR parameter includes two groups of parameters, the SINR parameter includes a first group of parameters and a second group of parameters, the first group of parameters include a first SINR value and a first SINR margin, and the second group of parameters include a second SINR value and a second SINR margin. A meaning of the first SINR value is the same as a meaning of the first SINR value in (1) Implementation 1 of the SINR parameter described above. A meaning of the first SINR margin is the same as a meaning of the first SINR margin in (2) Implementation 2 of the SINR parameter described above. Details are not described herein again. A meaning of the second SINR value is the same as a meaning of the second SINR value in (1) Implementation 1 of the SINR parameter described above. A meaning of the second SINR margin is the same as a meaning of the second SINR margin in (2) Implementation 2 of the SINR parameter described above. Details are not described herein again.

In some feasible implementations, Embodiment 4 of this application may be implemented separately, or may be implemented together with Embodiment 2 or 3 described above. For example, the first multi-link device sends cross-link interference parameters in a plurality of bandwidth combinations and corresponding SINR parameters. The second device determines an STR capability in a specific bandwidth combination based on an RSSI change.

In some feasible implementations, if it is determined that the first multi-link device supports the simultaneous transmit and receive operation on the first link and the second link, the second device may communicate with the first multi-link device on the first link and the second link in a simultaneous transmit and receive manner. Specifically, when the first multi-link device may send a PPDU on the first link, the second device sends a PPDU to the first multi-link device on the second link. In other words, the first multi-link device and the second device perform uplink communication through the first link concurrently with performing downlink communication through the second link. That is, the first link and the second link are used independently for communication. Alternatively, it may be understood that when the first multi-link device sends a PPDU on the second link, the second device sends a PPDU to the first multi-link device on the first link. In other words, the first multi-link device and the second device perform uplink communication through the first link, and perform downlink communication through the second link.

If it is determined that the first multi-link device does not support the simultaneous transmit and receive operation on the first link and the second link, in a communication process between the first multi-link device and the second device, PPDUs on the first link and the second link need to be aligned. That is, an end moment of a PPDU on the first link is aligned with an end moment of a PPDU on the second link. Specifically, the first multi-link device and the second device concurrently transmit uplink data or downlink data on the first link and the second link. For example, the first multi-link device simultaneously or concurrently sends PPDUs on the first link and the second link. Alternatively, the second device simultaneously or concurrently sends PPDUs to the first multi-link device on the first link and the second link. The end moment of the PPDU on the first link is the same as the end moment of the PPDU on the second link.

In this embodiment of this application, the STR capability is determined with reference to the SINR parameter (the SINR value and/or the SINR margin), so that not only the current STR capability may be determined, but also the STR capability may be determined based on an RSSI change in a movement scenario, and the first multi-link device does not need to measure the SINR parameter in real time or send the parameter to the second device. Therefore, signaling overheads and complexity are reduced.

The foregoing content describes the technical solutions in Embodiment 4 of this application. For better understanding of the technical solutions provided in Embodiment 4 of this application, the following describes possible frame structures in Embodiment 4 of this application. The following examples are examples of possible frame structures carrying an SINR parameter.

Figure 13A:
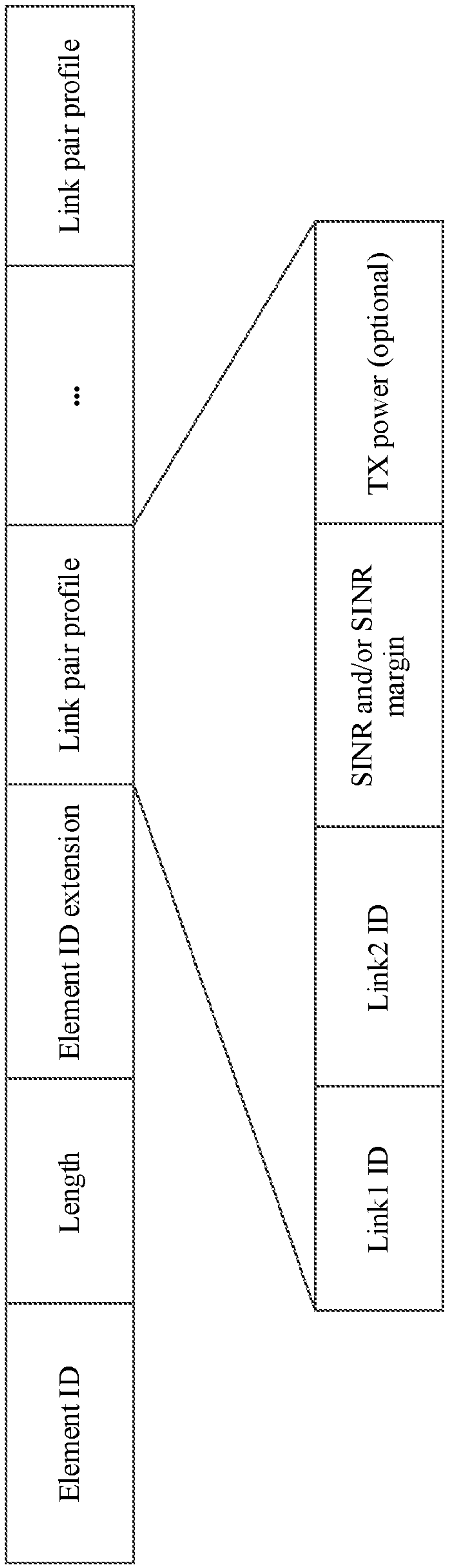
FIG. 13*a* is a schematic diagram of a first frame structure carrying an SINR parameter according to an embodiment of this application.

In an example, FIG. 13*a* is a schematic diagram of a first frame structure carrying an SINR parameter according to an embodiment of this application. As shown in FIG. 13*a*, an element field includes an element identifier field, a length field, an element identifier extension field, and at least one link pair profile field. Each link pair profile field includes an SINR and/or an SINR margin of a link pair. A specific field is that shown in FIG. 13*a*. The combination of "SINR and/or SINR margin" includes an SINR value or an SINR margin value, or carries an SINR value and an SINR margin value.

Figure 13B:
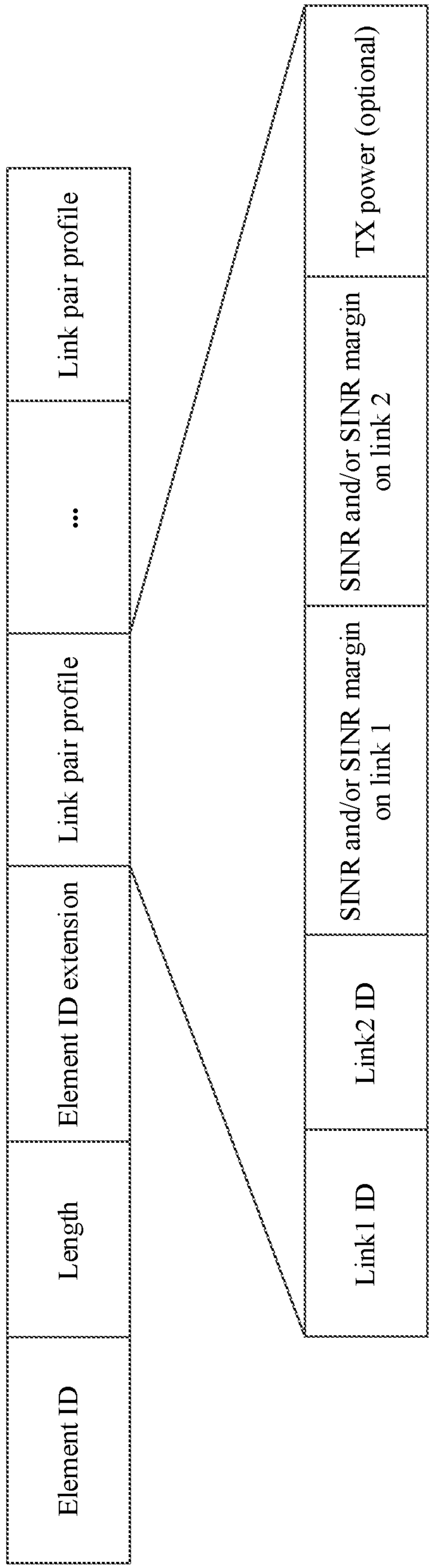
FIG. 13*b* is a schematic diagram of a second frame structure carrying an SINR parameter according to an embodiment of this application.

In another example, FIG. 13*b* is a schematic diagram of a second frame structure carrying an SINR parameter according to an embodiment of this application. As shown in FIG. 13*b*, an element field includes an element identifier field, a length field, an element identifier extension field, and at least one link pair profile field. Each link pair profile field includes an SINR and/or an SINR margin of a link pair in a different direction. That is, each link pair carries two SINRs and/or SINR margins, and each SINR and/or SINR margin corresponds to one direction.

Figure 13C:
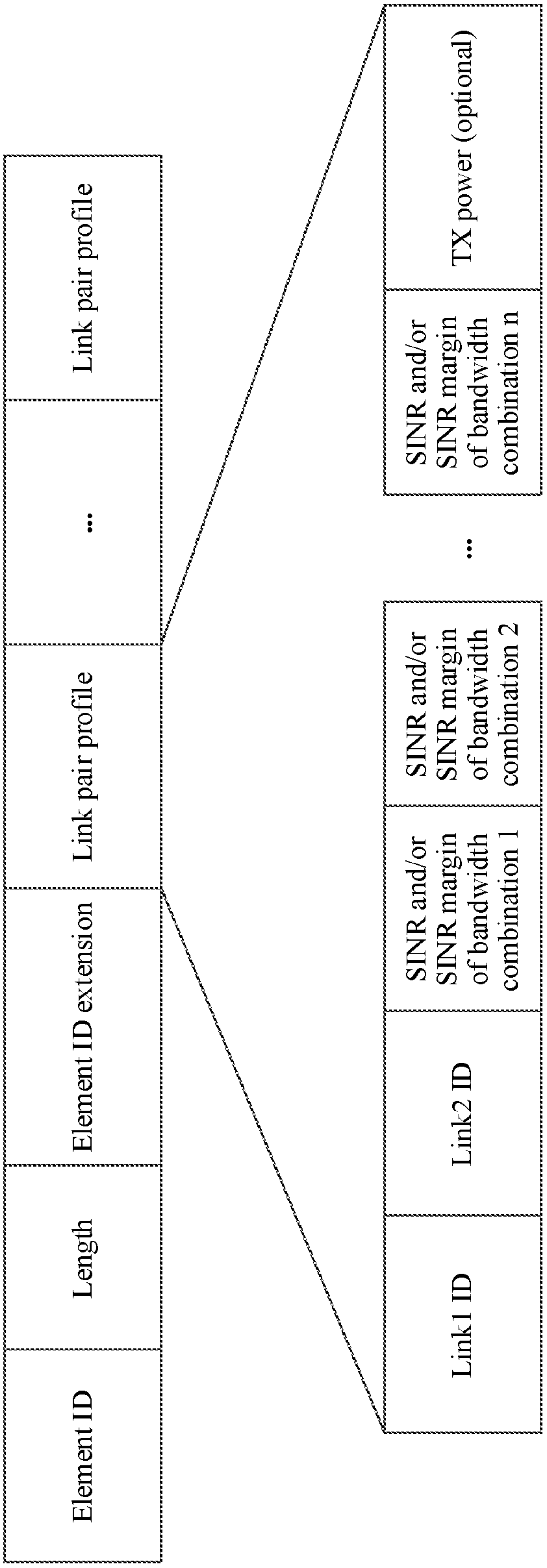
FIG. 13*c* is a schematic diagram of a third frame structure carrying an SINR parameter according to an embodiment of this application.

In still another example, FIG. 13*c* is a schematic diagram of a third frame structure carrying an SINR parameter according to an embodiment of this application. As shown in FIG. 13*c*, an element field includes an element identifier field, a length field, an element identifier extension field, and at least one link pair profile field. Each link pair profile field includes an SINR and/or an SINR margin of a link pair in a different bandwidth combination. That is, each link pair carries one or more SINRs and/or SINR margins, and each SINR and/or SINR margin corresponds to one bandwidth combination.

The foregoing content describes in detail the methods provided in this application. To better implement the foregoing solutions in the embodiments of this application, the embodiments of this application further provide corresponding apparatuses or devices.

Figure 14:
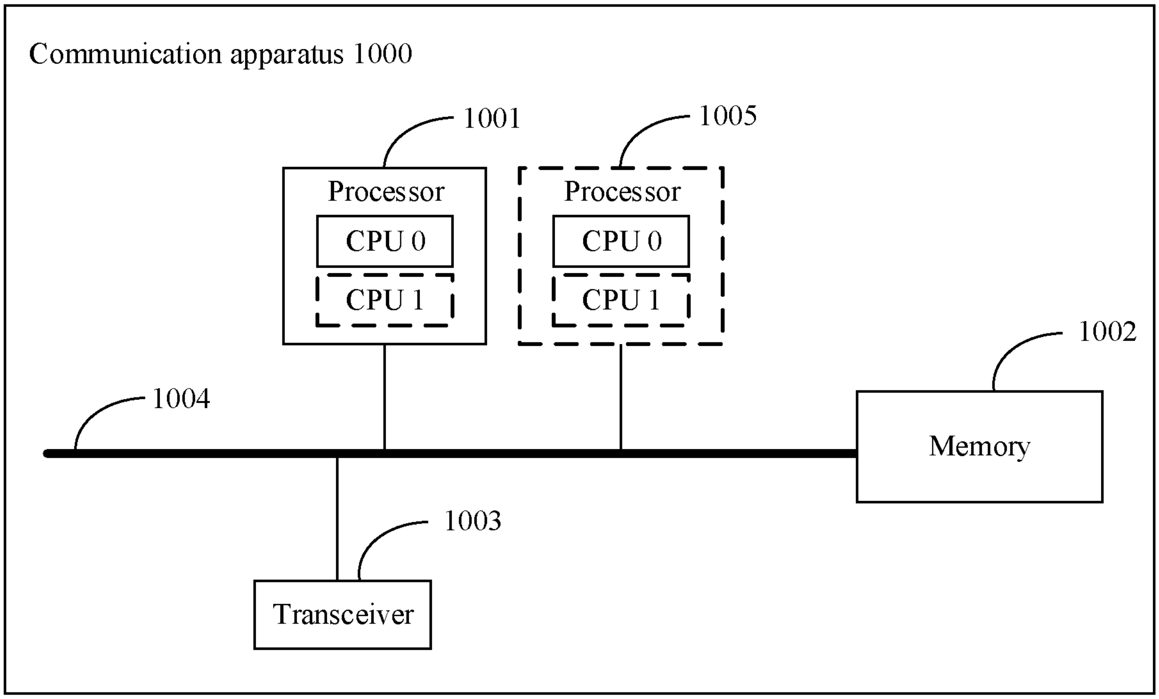
FIG. 14 is a schematic diagram of a structure of a communication apparatus according to an embodiment of this application.

FIG. 14 is a schematic diagram of a structure of a communication apparatus according to an embodiment of this application. As shown in FIG. 14, the communication apparatus 1000 may be the first multi-link device or the second device in any one of the foregoing embodiments, or may be a chip or a processing system in the first multi-link device or the second device, and may implement the method and the function in any one of the foregoing embodiments. Due to a difference in integration degrees, the communication apparatus 1000 may include one or more of the components shown in FIG. 14. The components shown in FIG. 14 may include at least one processor 1001, a memory 1002, a transceiver 1003, and a communication bus 1004. The processor, the transceiver, the memory, and the like are connected by using a bus. A specific connection medium between the foregoing components is not limited in this embodiment of this application.

The following specifically describes the components of the communication apparatus 1000 with reference to FIG. 14.

The processor 1001 is a control center of the communication apparatus 1000, and may be one processor or a collective term of a plurality of processing elements. For example, the processor 1001 is a central processing unit (CPU), an application-specific integrated circuit (ASIC), or one or more integrated circuits configured to implement this embodiment of this application, for example, one or more microprocessors (DSP), or one or more field programmable gate arrays (FPGA). The processor 1001 may perform various functions of the communication device by running or executing a software program stored in the memory 1002 and invoking data stored in the memory 1002. During specific implementation, in an embodiment, the processor 1001 may include one or more CPUs, such as a CPU 0 and a CPU 1 in FIG. 14.

During specific implementation, in an embodiment, the communication apparatus 1000 may include a plurality of processors, such as the processor 1001 and a processor 1005 in FIG. 14. Each of the processors may be a single-core (single-CPU) processor or may be a multi-core (multi-CPU) processor. The processor herein may be one or more communication devices, circuits, and/or processing cores configured to process data (for example, computer program instructions).

The memory 1002 may be a read-only memory (ROM) or another type of static storage communication device that can store static information and instructions, or a random access memory (RAM) or another type of dynamic storage communication device that can store information and instructions. The memory 1002 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that is accessible by a computer. However, the memory 1002 is not limited thereto. The memory 1002 may exist independently, and is connected to the processor 1001 by using the communication bus 1004. Alternatively, the memory 1002 may be integrated with the processor 1001. The memory 1002 is configured to store a software program for performing the solutions of this application, and the processor 1001 controls the execution.

The transceiver 1003 is configured to communicate with another device (for example, a second device). Certainly, the transceiver 1003 may be further configured to communicate with a communication network. The communication network is, for example, Ethernet, a radio access network (RAN), or a wireless local area network. The transceiver 1003 may include a receiving unit for implementing a receiving function, and a sending unit for implementing a sending function.

The communication bus 1004 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

In an example, the communication apparatus 1000 may be an entire device, and the communication apparatus may include a processor 1001, a memory 1002, a transceiver 1003, and a communication bus 1004. Optionally, another component, for example, a display screen, a user interface, or a signal detector may be further included.

Optionally, the communication apparatus 1000 is a first multi-link device, and may be configured to implement the method and the function related to the first multi-link device in any one of the foregoing embodiments. For example, the memory stores instructions, and when the processor invokes the instructions, the foregoing methods and functions are implemented. For example, the processor is configured to generate various types of information, and the transceiver is configured to send the information. For example, the processor is configured to generate the first indication information in step S101, or perform step S201, or perform steps S301 to S303, or perform step S401, and the transceiver is configured to perform step S101, S202, S304, S402, or the like.

Optionally, the communication apparatus 1000 is a second device, and may be configured to implement the method and the function related to the second device in any one of the foregoing embodiments. For example, the memory stores instructions, and when the processor invokes the instructions, the foregoing methods and functions are implemented. For example, the processor is configured to process various types of information, and the transceiver is configured to send the information. For example, the processor is configured to perform step S102, S203, S204, S305, S403, or the like, and the transceiver is configured to receive the information, parameters, or the like sent in step S101, S20, S304, or S402.

In another example, the communication apparatus 1000 may be a chip system or a processing system in the first multi-link device or the second device, so that a device installed with the chip system or the processing system implements the method and the function in any one of the foregoing embodiments. In this case, the communication apparatus 1000 may include some components shown in FIG. 14. For example, the communication apparatus 1000 includes a processor. The processor may be coupled to a memory, invoke instructions in the memory, and execute the instructions, so that a device configured or installed with the chip system or the processing system implements the methods and the functions in the foregoing embodiments. Optionally, the memory may be a component in the chip system or the processing system, or may be a component outside the chip system or the processing system in a coupling link to the chip system or the processing system. In an example, the chip system or the processing system is installed in the first multi-link device, so that the first multi-link device can implement the corresponding method and function in any one of the foregoing embodiments. In still another example, the chip system or the processing system is installed in the second device, so that the second device can implement the corresponding methods and functions in the foregoing embodiments.

The chip system or processing system may support communication based on 802.11 series protocols, for example, 802.11be, 802.11ax, and 802.11ac. The chip system may be installed in various devices supporting WLAN transmission scenarios. The devices in the WLAN transmission scenarios have been described in the specification of this application, and details are not described herein again.

In the embodiments of this application, the first multi-link device or the second device may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 15:
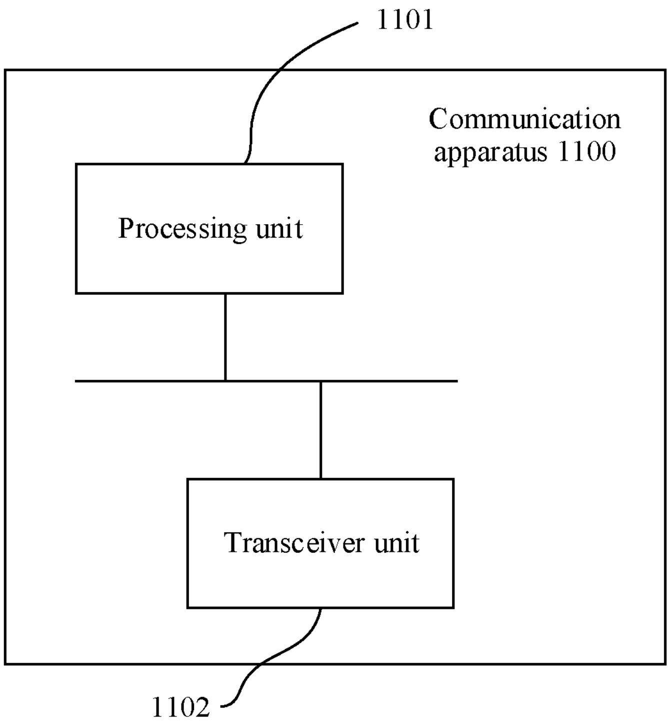
FIG. 15 is a schematic diagram of another structure of a communication apparatus according to an embodiment of this application.

When an integrated unit is used, FIG. 15 is a schematic diagram of another structure of a communication apparatus according to an embodiment of this application. As shown in FIG. 15, the communication apparatus 1100 may be a chip or a processing system in a first multi-link device or a second device, and the communication apparatus 1100 may perform operations of the first multi-link device or the second device in the foregoing method embodiments. The communication apparatus 1100 includes a processing unit 1101 and a transceiver unit 1102.

In an example, the communication apparatus 1100 is a first multi-link device.

The processing unit 1101 may be configured to control and manage an action of the communication apparatus 1100, for example, generate first indication information or STR capability information, and for another example, control an operation of the transceiver unit 1102. Optionally, if the communication apparatus 1100 includes a storage unit, the processing unit 1101 may further execute a program or instructions stored in the storage unit, to enable the communication apparatus 1100 to implement the method and the function in any one of the foregoing embodiments.

For example, the processing unit 1101 may be configured to perform, for example, S201, steps S301 to S303, step S401, and/or another process of the technology described in this specification. All related content of the steps in the foregoing method embodiments may be cited in function descriptions of corresponding function modules. Details are not described herein again.

For example, the transceiver unit 1102 may receive or send data or signaling transmitted on one link, or may receive or send data or signaling transmitted on a plurality of links. Optionally, the transceiver unit 1102 may be one transceiver module, or may include a plurality of transceiver modules. When the transceiver unit 1102 is one transceiver module, the transceiver module may receive or send data on a plurality of links. For example, if the first multi-link device works on two links, when the transceiver unit 1102 includes two transceiver modules, one transceiver module works on one link, and the other transceiver module works on the other link. For example, the transceiver unit 1102 may be configured to perform, for example, step S101, S202, S304, or S402, and/or another process of the technology described in this specification. All related content of the steps in the foregoing method embodiments may be cited in function descriptions of corresponding function modules. Details are not described herein again.

For example, the communication apparatus 1100 may be the communication apparatus shown in FIG. 14, the processing unit 1101 may be the processor 1001 in FIG. 14, and the transceiver unit 1102 may be the transceiver 1003 in FIG. 14. Optionally, the communication apparatus 1100 may further include a memory. The memory is configured to store program code and data that correspond to any one of the foregoing embodiments performed by the communication apparatus 1100. Descriptions of all related content of the components in FIG. 14 may be cited in function descriptions of corresponding components of the communication apparatus 1100, and details are not described herein again.

For example, the communication apparatus 1100 may alternatively be a chip or a processor, the processing unit 1101 is a processing circuit in the chip or the processor, the transceiver unit 1102 may be an input/output circuit in the chip or the processor, the input/output circuit is an interface for mutual communication or data exchange between the chip or the processor and another coupled component. It can be ensured that signaling or data information or program instructions are input to the chip or the processor for processing, the processed data or signaling is output to the another coupled component, and the first multi-link device installed with the chip or the processor is controlled to implement a function.

In another example, the communication apparatus 1100 is the second device.

For example, the processing unit 1101 may be configured to perform, for example, step S102, S203, S204, S305, or S403, and/or another process of the technology described in this specification. All related content of the steps in the foregoing method embodiments may be cited in function descriptions of corresponding function modules. Details are not described herein again.

For example, the transceiver unit 1102 may receive or send data or signaling transmitted on one link, or may receive or send data or signaling transmitted on a plurality of links. Optionally, the transceiver unit 1102 may be one transceiver module, or may include a plurality of transceiver modules. When the transceiver unit 1102 is one transceiver module, the transceiver module may receive or send data on a plurality of links. For example, if the second device works on two links, when the transceiver unit 1102 includes two transceiver modules, one transceiver module works on one link, and the other transceiver module works on the other link. For example, the transceiver unit 1102 may be configured to receive the information or the parameter sent in step S101, S20, S304, or S402, and/or may be used in another process of the technology described in this specification. All related content of the steps in the foregoing method embodiments may be cited in function descriptions of corresponding function modules. Details are not described herein again.

For example, the communication apparatus 1100 may be the communication apparatus shown in FIG. 14, the processing unit 1101 may be the processor 1001 in FIG. 14, and the transceiver unit 1102 may be the transceiver 1003 in FIG. 14. Optionally, the communication apparatus 1100 may further include a memory. The memory is configured to store program code and data that correspond to any one of the foregoing embodiments performed by the communication apparatus 1100. Descriptions of all related content of the components in FIG. 14 may be cited in function descriptions of corresponding components of the communication apparatus 1100, and details are not described herein again.

For example, the communication apparatus 1100 may alternatively be a chip or a processor, the processing unit 1101 is a processing circuit in the chip or the processor, the transceiver unit 1102 may be an input/output circuit in the chip or the processor, the input/output circuit is an interface for mutual communication or data exchange between the chip or the processor and another coupled component. It can be ensured that signaling or data information or program instructions are input to the chip or the processor for processing, the processed data or signaling is output to the another coupled component, and a device installed with the chip or the processor is controlled to implement a function.

An embodiment of this application further provides a computer-readable storage medium. The computer-readable storage medium stores computer program code. When the foregoing processor executes the computer program code, an electronic device performs the STR capability indication method in any one of the foregoing embodiments. The readable storage medium is a non-volatile readable storage medium.

An embodiment of this application further provides a computer program product. When the computer program product runs on a computer, the computer is enabled to perform the STR capability indication method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the STR capability indication method in any one of the foregoing embodiments.

An embodiment of this application further provides a communication system, including a first multi-link device and a second device. The first multi-link device and the second device may perform the STR capability indication method in any one of the foregoing embodiments.

Method or algorithm steps described in combination with the content disclosed in this application may be implemented by hardware, or may be implemented by a processor by executing a software instruction. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or special-purpose computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall in the protection scope of this application.

What is claimed is:

1. A method for indicating link capability performed by a multi-link device (MLD) in a Wi-Fi network, comprising:

determining whether the MLD supports transmission on a first link concurrent with reception on a second link;

determining whether the MLD supports transmission on the second link concurrent with reception on the first link;

determining that the MLD does not support a simultaneous transmit and receive (STR) operation on a link pair comprising the first link and the second link when determining that the MLD supports the transmission on the second link concurrent with the reception on the first link and does not support the transmission on the first link concurrent with the reception on the second link, or the MLD supports the transmission on the first link concurrent with the reception on the second link and does not support the transmission on the second link concurrent with the reception on the first link; and sending indication information to a second device, wherein the indication information indicates that the MLD does not support the STR operation on the link pair.

2. The method according to claim 1, wherein the method further comprising:

determining that the MLD supports the STR operation on the link pair when the MLD supports the transmission on the second link concurrent with the reception on the first link and supports the transmission on the first link concurrent with the reception on the second link.

3. The method according to claim 1, wherein the step of sending the indication information to the second device comprises:

sending an association request frame to the second device, wherein the association request frame comprises the indication information.

4. The method according to claim 1, wherein the indication information comprises one bit.

5. The method according to claim 4, wherein a value of 1 of the bit indicates that the MLD supports the STR operation on the link pair, and a value of 0 of the bit indicates that the MLD does not support the STR operation on the link pair.

6. The method according to claim 1, wherein the MLD is a non-access point multi-link device (non-AP MLD), and the second device is a single-link device access point (AP) or an access point multi-link device (AP MLD); or the MLD is an AP MLD, and the second device is a single-link device station or a non-AP MLD.

7. The method according to claim 1, wherein working frequency bands of the MLD comprise two or more of frequency bands of sub 1 GHz, 2.4 GHZ, 5 GHZ, 6 GHz, and 60 GHz, wherein each working frequency band corresponds to one link.

8. A multi-link device (MLD) comprising:

a memory storing executable instructions; and a processor configured to execute the executable instructions to perform operations of:

determining whether the MLD supports transmission on a first link concurrent with reception on a second link;

determining whether the MLD supports transmission on the second link concurrent with reception on the first link;

determining that the MLD does not support a simultaneous transmit and receive (STR) operation on a link pair comprising the first link and the second link when determining that the MLD supports the transmission on the second link concurrent with the reception on the first link and does not support the transmission on the first link concurrent with the reception on the second link, or the MLD supports the transmission on the first link concurrent with the reception on the second link and does not support transmission on the second link concurrent with reception on the first link; and sending indication information to a second device, wherein the indication information indicates that the MLD does not support the STR operation on the link pair.

9. The MLD according to claim 8, wherein the operation further comprises:

determining that the MLD supports the STR operation on the link pair when the MLD supports the transmission on the second link concurrent with the reception on the first link and supports the transmission on the first link concurrent with the reception on the second link.

10. The MLD according to claim 8, wherein the operation of sending the indication information to the second device comprises:

sending an association request frame to the second device, wherein the association request frame comprises the indication information.

11. The MLD according to claim 8, wherein the indication information comprises one bit.

12. The MLD according to claim 11, wherein a value of 1 of the bit indicates that the MLD supports the STR operation on the link pair, and a value of 0 of the bit indicates that the MLD does not support the STR operation on the link pair.

13. The MLD according to claim 8, wherein the MLD is a non-access point multi-link device (non-AP MLD), and the second device is a single-link device access point (AP) or an access point multi-link device (AP MLD); or the MLD is an AP MLD, and the second device is a single-link device station or a non-AP MLD.

14. The MLD according to claim 8, wherein the MLD is configured to operate in working frequency bands comprising two or more of frequency bands of sub 1 GHz, 2.4 GHz, 5 GHz, 6 GHZ, and 60 GHz, wherein each working frequency band corresponds to one link.

15. A non-transitory computer-readable storage medium having stored thereon executable instructions that when executed by a processor of a multi-link device (MLD) cause the MLD to perform operations of:

determining whether the MLD supports transmission on a first link concurrent with reception on a second link;

determining whether the MLD supports transmission on the second link concurrent with reception on the first link;

determining that the MLD does not support a simultaneous transmit and receive (STR) operation on a link pair comprising the first link and the second link when determining that the MLD supports the transmission on the second link concurrent with the reception on the first link and does not support the transmission on the first link concurrent with the reception on the second link, or the MLD supports the transmission on the first link concurrent with the reception on the second link and does not support the transmission on the second link concurrent with the reception on the first link; and sending indication information to a second device, wherein the indication information indicates that the MLD does not support the STR operation on the link pair.

16. The method according to claim 4, wherein a value of 0 of the bit indicates that the MLD supports the STR operation on the link pair, and a value of 1 of the bit indicates that the MLD does not support the STR operation on the link pair.

17. The MLD according to claim 11, wherein a value of 0 of the bit indicates that the MLD supports the STR operation on the link pair, and a value of 1 of the bit indicates that the MLD does not support the STR operation on the link pair.

18. The non-transitory computer-readable storage medium according to claim 15, wherein the indication information comprises one bit, a value of 0 of the bit indicates that the MLD supports the STR operation on the link pair, and a value of 1 of the bit indicates that the MLD does not support the STR operation on the link pair.

* * * * *